United States Patent
Chou et al.

(10) Patent No.: US 8,363,515 B1
(45) Date of Patent: Jan. 29, 2013

(54) THERMALLY-ASSISTED MAGNETIC RECORDING HEAD, HEAD GIMBALS ASSEMBLY, HEAD ARM ASSEMBLY, AND MAGNETIC DISK UNIT

(75) Inventors: Tsutomu Chou, Tokyo (JP); Koji Shimazawa, Tokyo (JP); Shinji Hara, Tokyo (JP); Eiji Komura, Tokyo (JP); Ryo Hosoi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/397,041

(22) Filed: Feb. 15, 2012

(51) Int. Cl.
*G11B 11/00* (2006.01)

(52) U.S. Cl. ............. 369/13.33; 369/13.13; 369/112.27

(58) Field of Classification Search ............... 369/13.33, 369/13.32, 13.14, 13.24, 13.03, 13.02, 13.12, 369/13.13, 13.01, 13.35, 13.17, 112.27, 112.09, 369/112.01; 360/59, 125.31, 125.74, 125.75
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,855,937 B2 * | 12/2010 | Shimazawa et al. | 369/13.33 |
| 8,000,178 B2 * | 8/2011 | Shimazawa et al. | 369/13.33 |
| 8,184,506 B2 * | 5/2012 | Hirata et al. | 369/13.33 |
| 2010/0260015 A1 | 10/2010 | Sasaki et al. | |
| 2012/0275280 A1 * | 11/2012 | Miyauchi et al. | 369/13.33 |

FOREIGN PATENT DOCUMENTS

| | | |
|---|---|---|
| JP | A-2001-255254 | 9/2001 |
| JP | B2-4032689 | 1/2008 |
| JP | B2-4104584 | 6/2008 |
| JP | A-2010-244670 | 10/2010 |

OTHER PUBLICATIONS

U.S. Appl. No. 13/097,133, filed in the name of Miyauchi et al. on Apr. 29, 2011.

* cited by examiner

*Primary Examiner* — Ali Neyzari
(74) *Attorney, Agent, or Firm* — Oliff & Berridge, PLC

(57) ABSTRACT

The thermally-assisted magnetic recording head includes: a magnetic pole; a waveguide propagating light in a first direction, the first direction intersecting with an air bearing surface; a plasmon generator having a base and a projection, the base having a surface, and the projection having a top, standing partially on the surface of the base and extending in the first direction. The plasmon generator has a first portion and a second portion, and the first portion and the second portion are provided in this order from the air bearing surface in a direction away from the air bearing surface. Herein, the top of the projection and the surface of the base in the first portion define a first step, and the top of the projection and the surface of the base in the second portion define a second step. The first step is larger than the second step.

14 Claims, 18 Drawing Sheets

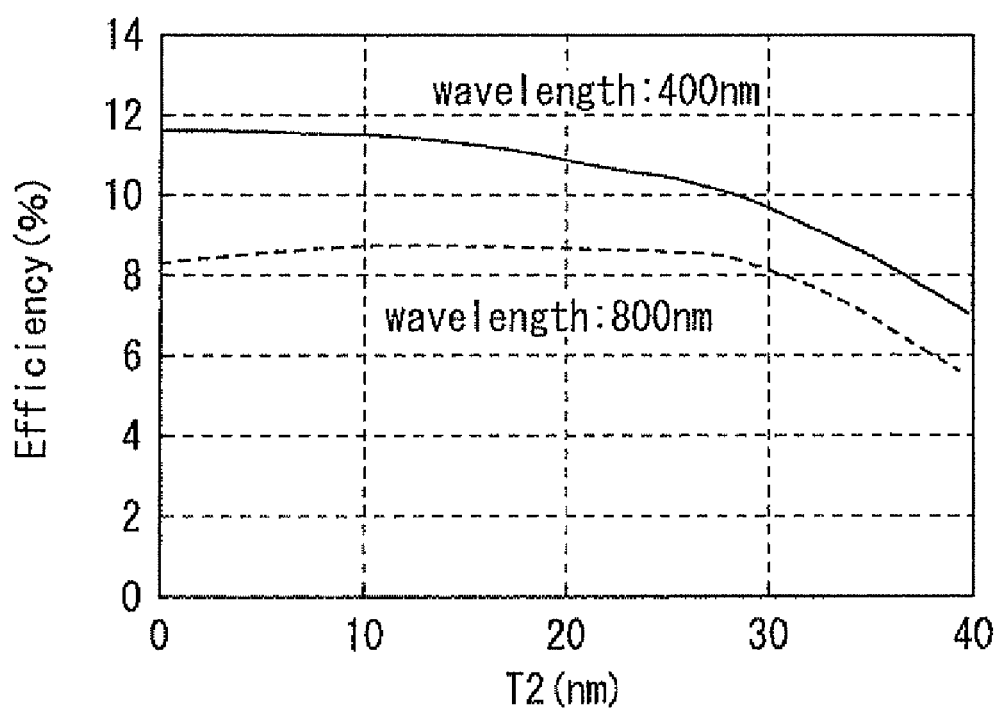
F I G. 23

THERMALLY-ASSISTED MAGNETIC RECORDING HEAD, HEAD GIMBALS ASSEMBLY, HEAD ARM ASSEMBLY, AND MAGNETIC DISK UNIT

BACKGROUND OF THE INVENTION

1. Field of the Invention

The present invention relates to a thermally-assisted magnetic recording head used in a thermally-assisted magnetic recording in which near-field light is applied to a magnetic recording medium to lower a coercivity thereof so as to record information, and a head gimbals assembly, a head arm assembly, and a magnetic disk unit which are provided with the thermally-assisted magnetic recording head.

2. Description of Related Art

A magnetic disk unit in the related art is used for writing and reading magnetic information (hereinafter, simply referred to as information). The magnetic disk unit is provided with, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic write element and a magnetic read element which have an air bearing surface (ABS) facing the magnetic disk. In particular, as the magnetic read element, a magneto-resistive (MR) element exhibiting magneto-resistive effect is generally used. The other end of the suspension is attached to an end of an arm which is rotatably supported by a fixed shaft installed upright in the housing.

When the magnetic disk unit is not operated, namely, when the magnetic disk does not rotate, the magnetic read write head is not located over the magnetic disk and is pulled off to the position away from the magnetic disk (unload state). When the magnetic disk unit is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured by a plurality of magnetic microparticles. Since the roughness of a boundary between adjacent recording bits is necessary to be small in order to increase the recording density, the magnetic microparticles need to be made small. However, if the magnetic microparticles are small in size, thermal stability of the magnetization of the magnetic microparticles is lowered with decreasing the volume of the magnetic microparticles. To solve the difficulty, increasing magnetic anisotropy energy of the magnetic microparticle is effective. However, increasing the magnetic anisotropy energy of the magnetic microparticle leads to increase in the coercivity of the magnetic disk. As a result, difficulty occurs in the information recording using the existing magnetic head.

As a method to solve the above-described difficulty, a so-called thermally-assisted magnetic recording has been proposed. In the method, a magnetic recording medium with large coercivity is used, and when information is written, heat is applied together with the magnetic field to a portion of the magnetic recording medium where the information is recorded to increase the temperature and to lower the coercivity, thereby recording the information. Hereinafter, the magnetic head used in the thermally-assisted magnetic recording is referred to as a thermally-assisted magnetic recording head.

In the thermally-assisted magnetic recording, near-field light is generally used for applying heat to the magnetic recording medium. For example, in Japanese Unexamined Patent Application Publication No. 2001-255254 and in Japanese Patent No. 4032689, disclosed is a technology of matching frequency of light with a resonant frequency of plasmons which are generated in a metal, by directly applying light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

As a technique capable of avoiding such overheating, in Japanese Patent No. 4104584, a thermally-assisted head using surface plasmon polariton coupling is proposed. In this technique, without direct application of light propagating through a waveguide (guided light) to a plasmon generator, the guided light is coupled to the plasmon generator through evanescent coupling, and surface plasmon polariton generated on a surface of the plasmon generator is used.

With use of the surface plasmons, it is possible to prevent the entire plasmon generator from overheating. However, the technology in related art has not been developed to a level of practical use which prevents the temperature rise sufficiently. To improve recording efficiency, stronger near-field light is necessary. To this end, since the plasmon generator needs to be strongly coupled with guided light, strong light penetrates inside of the plasmon generator which is generally configured of a noble metal. The penetrating light is converted into heat, thereby losing energy. Such heat generation is inevitable even when surface plasmon polariton is used, and therefore a configuration of the plasmon generator with higher heat dissipation is necessary in order to achieve continuous use over a long period of time. Accordingly, a thermally-assisted magnetic recording head which is excellent in recording efficiency and has high reliability is demanded.

SUMMARY OF THE INVENTION

A thermally-assisted magnetic recording head according to an embodiment of the invention includes: a magnetic pole; a waveguide propagating light in a first direction, the first direction intersecting with an air bearing surface; a plasmon generator having a base and a projection, the base having a surface, and the projection having a top, standing partially on the surface of the base, and extending in the first direction. The plasmon generator has a first portion and a second portion, the first portion and the second portion are provided in this order from the air bearing surface in a direction away from the air bearing surface, the top of the projection and the surface of the base in the first portion define a first step, the top of the projection and the surface of the base in the second portion define a second step, and the first step is larger than the second step.

A head gimbals assembly, a head arm assembly, and a magnetic disk unit according to an embodiment of the invention includes the above-described thermally-assisted magnetic recording head.

In the thermally-assisted magnetic recording head, and the head gimbals assembly, the head arm assembly, and the magnetic disk unit which are provided with the thermally-assisted magnetic recording head, according to the embodiment of the invention, the guided light propagating through the waveguide and the plasmon generator are coupled in plasmon mode, and thus near-field light is generated from a near-field light generating end surface of the plasmon generator, which configures a part of the air bearing surface. In this case, in the first portion of the plasmon generator, a step between the top of the projection and the surface of the base is larger than that in the second portion positioned at the rear thereof, and therefore a spot size of the near-field light generated on the near-field light generating end surface is allowed to be made smaller. On the other hand, in the second portion, the provided step is smaller than that in the first portion so that the spot size is prevented from increasing, and heat dissipation thereof is allowed to be increased. As a result, magnetic recording is efficiently performed, and characteristics deterioration due to heat generation is prevented. Consequently, high reliability is allowed to be secured.

In the thermally-assisted magnetic recording head and the like according to the embodiments of the invention, the cross-section of the projection substantially parallel to the air bearing surface preferably has a rectangular or a trapezoidal shape because the shape is suitable for obtaining a smaller spot size. Moreover, the first step and the second step are preferably uniform in the first direction, in order to stabilize evanescent coupling between the guided light and the plasmon generator, and to improve light density of the near-field light.

BRIEF DESCRIPTION OF THE DRAWINGS

FIG. 23 is a characteristic diagram illustrating a relationship between a step of a rear portion of a plasmon generator and light efficiency, in Examples 3-1 to 3-2.

DETAILED DESCRIPTION OF THE PREFERRED EMBODIMENTS

Hereinafter, preferred embodiments of the invention will be described in detail with reference to drawings.

First Embodiment

[1. Configuration of Magnetic Disk Unit]

First, referring to FIG. 1 and FIG. 2, a configuration of a magnetic disk unit will be described below as a first embodiment of the invention.

Figure 1:
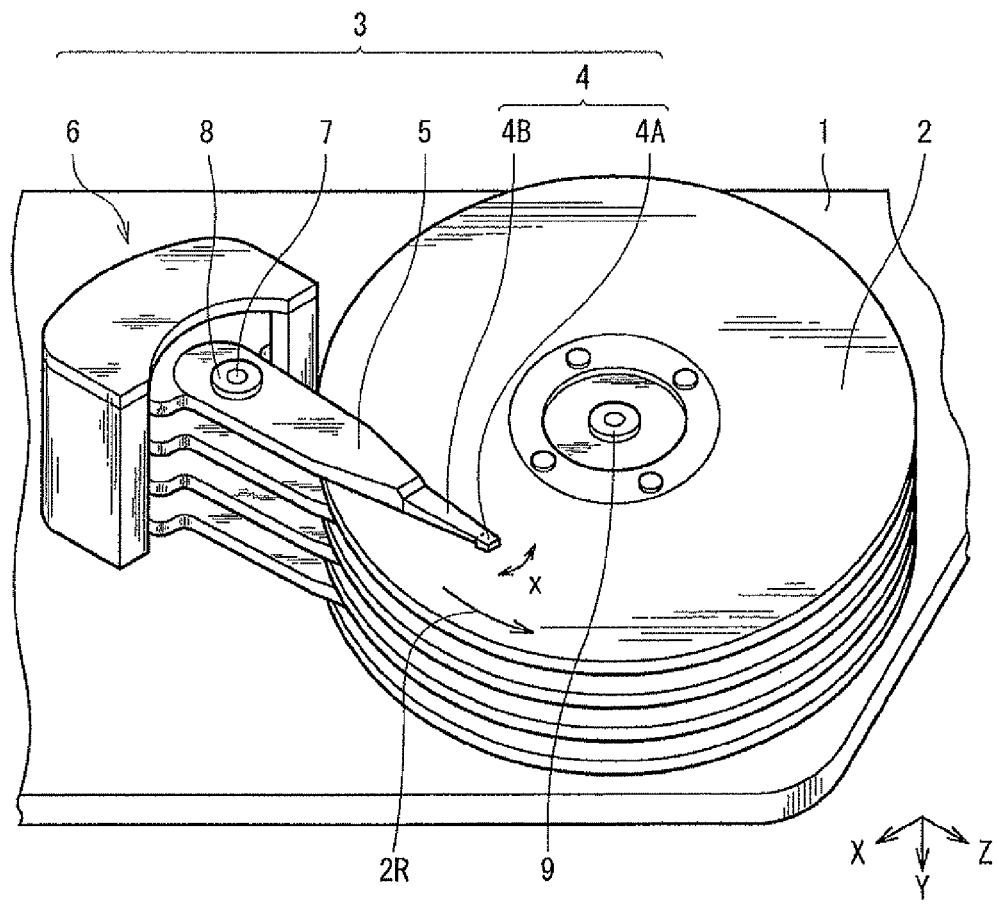
FIG. 1 is a perspective view illustrating a configuration of a magnetic disk unit provided with a thermally-assisted magnetic head device according to a first embodiment of the invention.

FIG. 1 is a perspective view illustrating an internal configuration of the magnetic disk unit as the embodiment. The magnetic disk unit adopts load/unload system as a driving system, and includes, in the housing 1, a magnetic disk 2 as a magnetic recording medium in which information is to be written, and a head arm assembly (HAA) 3 for writing information in the magnetic disk 2 and reading the information. The HAA 3 is provided with a head gimbals assembly (HGA) 4, an arm 5 supporting a base of the HGA 4, and a driver 6 as a power source for rotating the arm 5. The HGA 4 includes a thermally-assisted magnetic head device (hereinafter, simply referred to as a "magnetic head device") 4A having a side surface provided with a magnetic read write head section 10 (described later) according to the embodiment, and a suspension 4B having an end portion provided with the magnetic head device 4A. The arm 5 supports the other end of the suspension 4B (an end portion opposite to the end portion provided with the magnetic head device 4A). The arm 5 is configured so as to be rotatable, through a bearing 8, around a fixed shaft 7 fixed to the housing 1. The driver 6 is configured of, for example, a voice coil motor. Incidentally, the magnetic disk unit has a plurality of (four in FIG. 1) magnetic disks 2, and the magnetic head device 4A is disposed corresponding to recording surfaces (a front surface and a back surface) of each of the magnetic disks 2. Each magnetic head device 4A is allowed to move in a direction across write tracks, that is, in a track width direction (in X-axis direction) in a plane parallel to the recording surface of each magnetic disk 2. On the other hand, the magnetic disk 2 is configured to rotate around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or stored information is read out from the magnetic disk 2. Further, the magnetic disk unit has a control circuit (described later) which controls a write operation and a read operation of the magnetic read write head section 10, and controls an emission operation of a laser diode as a light source which generates laser light used for thermally-assisted magnetic recording (described later).

Figure 2:
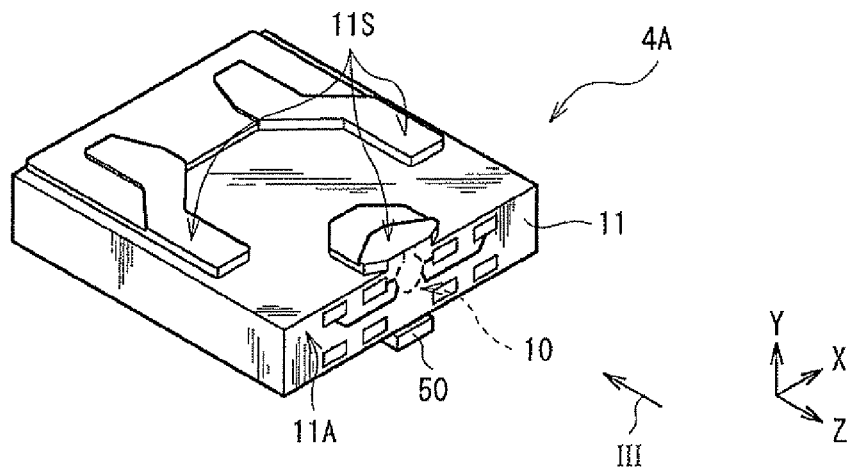
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 made of, for example, $Al_2O_3.TiC$ (AlTiC). The slider 11 is substantially formed as a hexahedron, for example, and one surface thereof corresponds to an ABS 11S disposed oppositely and proximally to the recording surface of the magnetic disk 2. When the magnetic disk unit is not driven, namely, when the spindle motor 9 is stopped and the magnetic disk 2 does not rotate, the magnetic head device 4A is pulled off to the position away from the magnetic disk 2 (unload state), in order to prevent contact of the ABS 11S and the recording surface. In contrast, when the magnetic disk unit is initiated, the magnetic disk 2 starts to rotate at a high speed by the spindle motor 9, and the arm 5 is rotationally moved around the fixed shaft 7 by the driver 6. Therefore, the magnetic head device 4A moves above the front surface of the magnetic disk 2, and is in a load state. The rotation of the magnetic disk 2 at a high speed leads to air flow between the recording surface and the ABS 11S, and lift force caused by the air flow leads to a state where the magnetic head device 4A floats to maintain a certain distance (magnetic spacing) MS (in FIG. 5 described later) along a direction (Y-axis direction) orthogonal to the recording surface. In addition, on the element forming surface 11A that is one side surface orthogonal to the ABS 11S, the magnetic read write head section 10 is provided. Incidentally, on a surface 11B opposite to the ABS 11S of the slider 11, a light source unit 50 is provided near the magnetic read write head section 10.

[2. Detailed Configuration of Magnetic Read Write Head Section]

Figure 3:
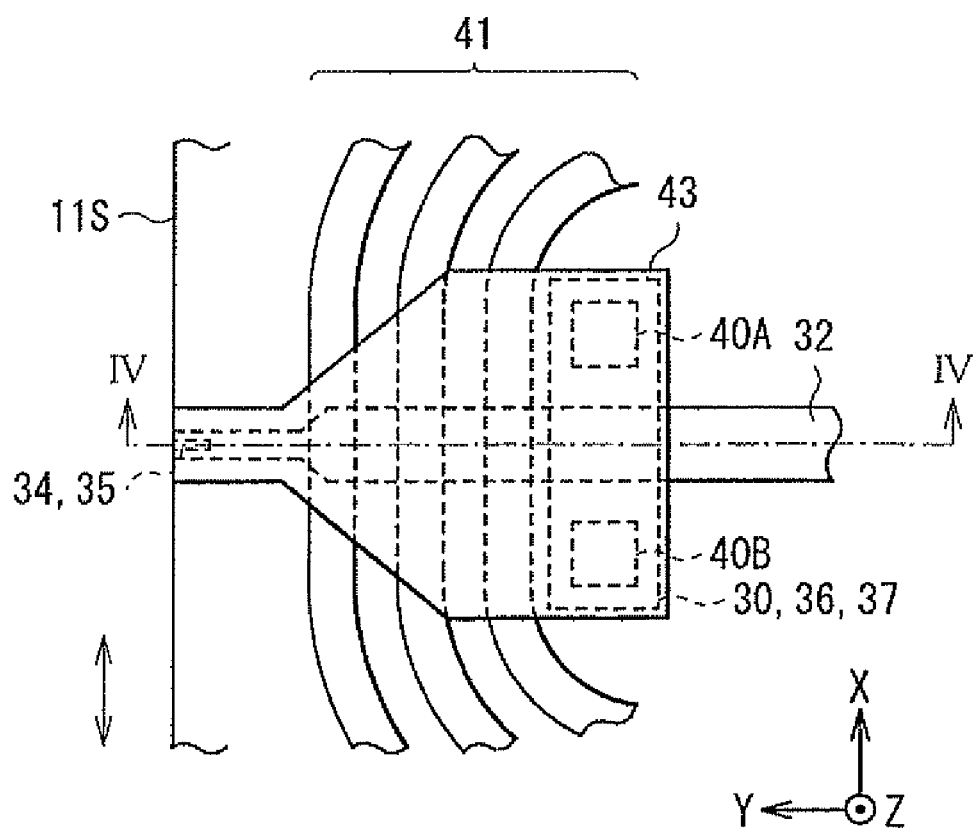
FIG. 3 is a plan view illustrating a configuration of a main part of a magnetic read write head viewed from an arrow III direction illustrated in FIG. 2.
Figure 4:
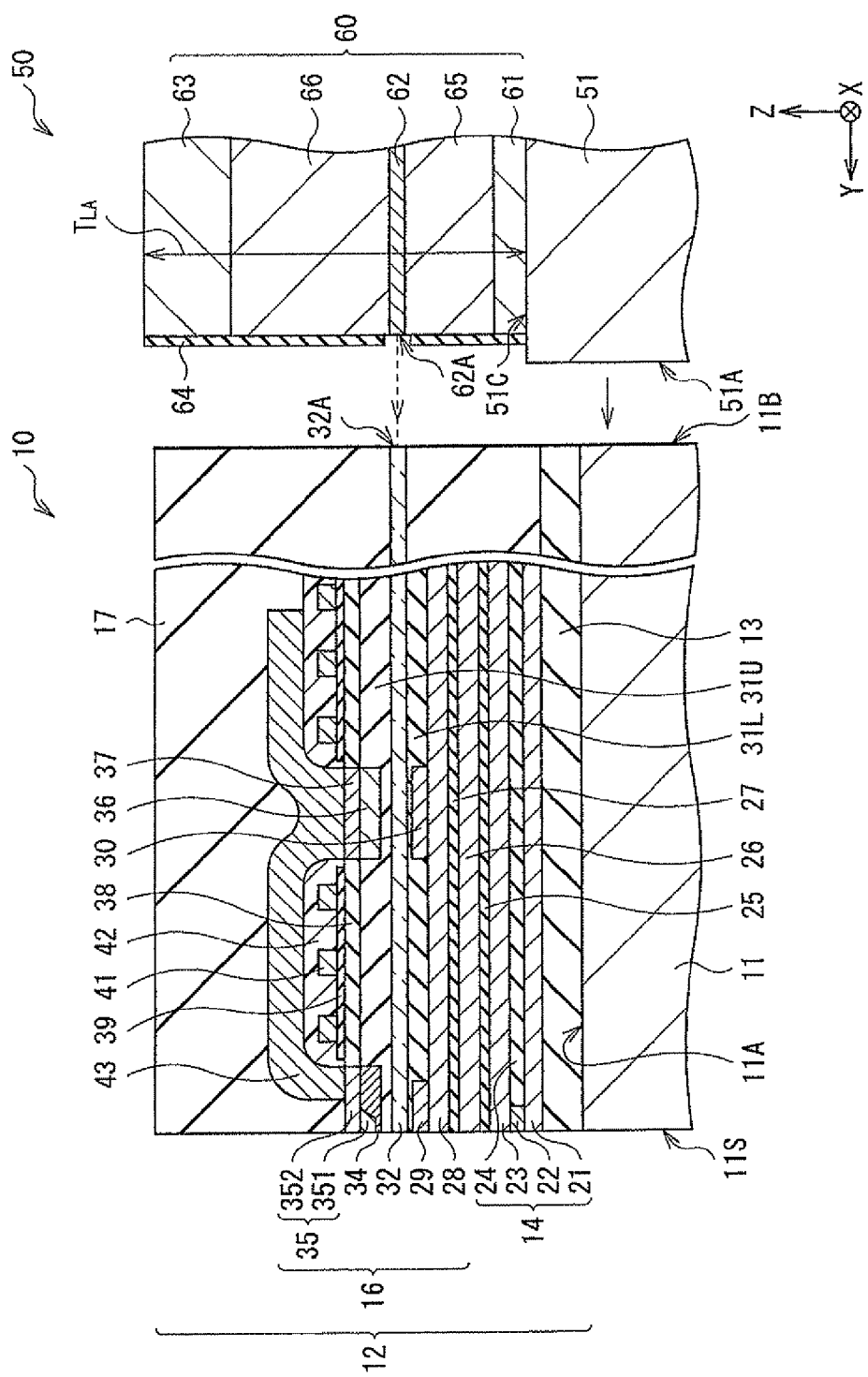
FIG. 4 is a sectional view illustrating a configuration of the magnetic read write head viewed from an arrow direction along a IV-IV line illustrated in FIG. 3.
Figure 5:
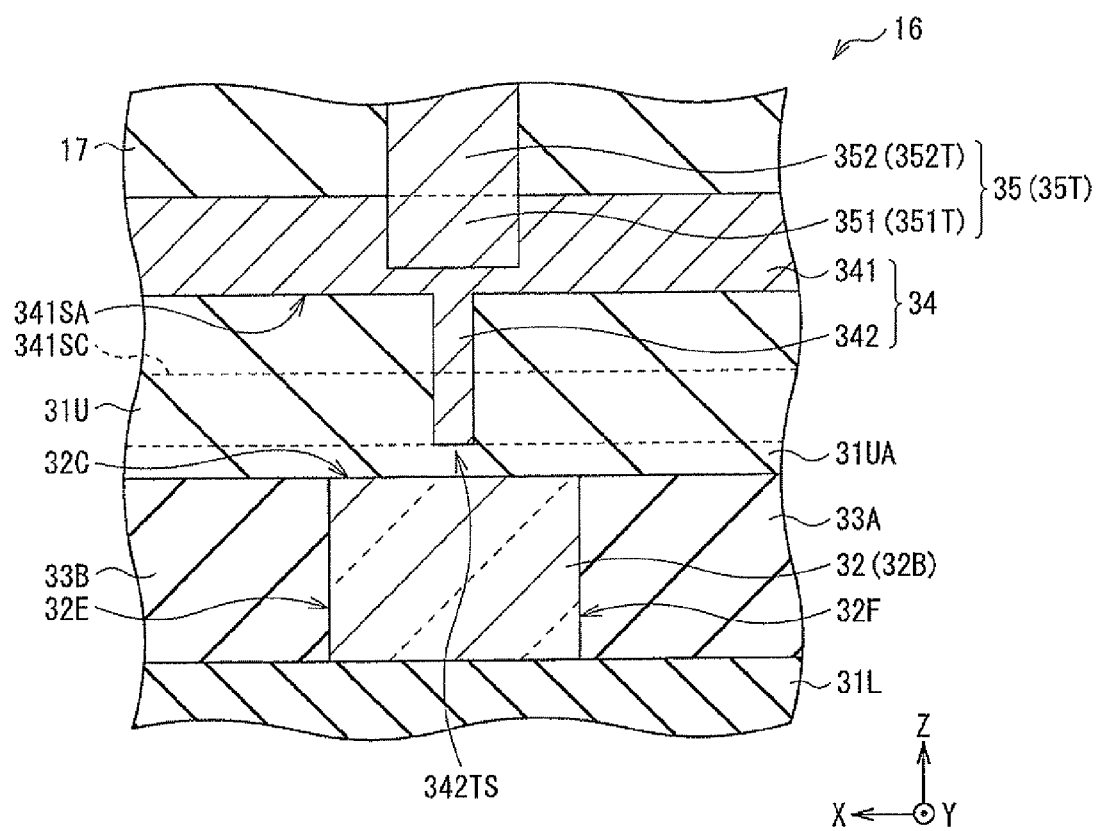
FIG. 5 is a plan view illustrating a configuration of an end surface exposed at an air bearing surface, of a write head section illustrated in FIG. 4.

Next, the magnetic read write head section 10 will be described in more detail with reference to FIG. 3 to FIG. 5. FIG. 3 is a plan view of the magnetic read write head section 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface, exposed at the ABS 11S, of the magnetic read write head section 10 in an enlarged manner. The magnetic read write head section 10 has a stacked structure including an insulating layer 13, a read head section 14, a write head section 16, and a cladding 17 which are embedded in an element forming layer 12 provided on a slider 11 and are stacked in order on the slider 11. Each of the read head section 14 and the write head section 16 has an end surface exposed at the ABS 11S.

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in Z-axis direction). As a result, the lower shield layer 21 and the upper shield layer 23 each exhibit a function to protect the MR element 22 from the influence of unnecessary magnetic field.

One end surface of the MR element 22 is exposed at the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), or DLC (diamond-like carbon).

The MR element 22 functions as a sensor for reading magnetic information written in the magnetic disk 2. Note that in the embodiment, in a direction (Y-axis direction) orthogonal to the ABS 11S, a direction toward the ABS 11S with the MR element 22 as a base or a position near the ABS 11S is called "front side". A direction toward opposite side from the ABS 11S with the MR element 22 as a base or a position away from the ABS 11S is called "back side". The MR element 22 is, for example, a CPP (current perpendicular to plane)-GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field using the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and is formed of, for example, a soft magnetic metal material such as NiFe. The insulating layers 25 and 27 are formed of the similar material to the insulating layer 24.

The write head section 16 is a vertical magnetic recording head performing a recording process of thermally-assisted magnetic recording system. The write head section 16 has, for example, a lower yoke layer 28, a leading shield 29 and a connecting layer 30, a cladding 31L, a waveguide 32, claddings 33A and 33B, and a cladding 31U in order on the insulating layer 27. The claddings 33A and 33B configure a first cladding pair sandwiching the waveguide 32 in the direction across tracks (in the X-axis direction). On the other hand, the claddings 31L and 31U configure a second cladding pair sandwiching the waveguide 32 in the thickness direction (in the Z-axis direction). Note that the leading shield 29 may be omitted from the structure.

The waveguide 32 is made of a dielectric material allowing laser light to pass therethrough. Examples of the constituent material of the waveguide 32 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). The claddings 33A, 33B, 31L, and 31U are made of a dielectric material having a refractive index with respect to laser light propagating through the waveguide 32, lower than that of a constituent material of the waveguide 32. In terms of the refractive index with respect to laser light propagating through the waveguide 32, the dielectric material constituting the claddings 33A and 33B and the dielectric material constituting the claddings 31L and 31U may be the same or different from each other. Examples of the dielectric material constituting the claddings 33A, 33B, 31L, and 31U include SiOx (silicon oxide), $Al_2O_3$ (aluminum oxide), AlN (aluminum nitride), and $Al_2O_3$.

The lower yoke layer 28, the leading shield 29, and the connecting layer 30 are each made of a soft magnetic metal material such as NiFe. The leading shield 29 is located at the frontmost end of the upper surface of the lower yoke layer 28 so that one end surface of the leading shield 29 is exposed at the ABS 11S. The connecting layer 30 is located backward of the leading shield 29 on the upper surface of the lower yoke layer 28. The cladding 31L is made of a dielectric material having a refractive index, with respect to laser light propagating through the waveguide 32, lower than that of the waveguide 32, and is provided to cover the lower yoke layer 28, the leading shield 29, and the connecting layer 30. The waveguide 32 provided on the cladding 31L extends in a direction (Y-axis direction) orthogonal to the ABS 11S, one end surface of the waveguide 32 is exposed at the ABS 11S, and the other end surface is exposed at the backward thereof. Note that the front end surface of the waveguide 32 may be located at a receded position from the ABS 11S without being exposed at the ABS 11S. In the waveguide 32, the shape of a cross-section parallel to the ABS 11S is, for example, a rectangular shape, but may be the other shapes.

The write head section 16 further includes a plasmon generator 34 provided above the front end of the waveguide 32 through the cladding 31U, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed at the ABS 11S. The magnetic pole 35 has a structure in which a first layer 351 and a second layer 352 are stacked in order on the plasmon generator 34, for example. Both the first layer 351 and the second layer 352 are configured of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the cladding 31U.

The write head section 16 further includes a connecting layer 36 embedded in the cladding 31U at the backward of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 includes two connecting sections 40A and 40B (FIG. 3) which are embedded in the claddings 31U, 33A, and 33B. The connecting sections 40A and 40B are also formed of a soft magnetic metal material such as NiFe. The connecting sections 40A and 40B extend in the Z-axis direction so as to connect the connecting layer 30 and the connecting layer 36, and are arranged in X-axis direction so as to sandwich the waveguide 32 with a distance.

As illustrated in FIG. 4, on the cladding 31U, an insulating layer 38 is provided to fill a space around the second layer 352 of the magnetic pole 35. An insulating layer 39 and the coil 41 which is formed in spiral around the connecting layer 37 are stacked in order on the insulating layer 38. The coil 41 is intended to generate magnetic flux for writing by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed at the ABS 11S, and the signal magnetic field reaches a predetermined region of the recording surface of the magnetic disk 2.

Further, in the magnetic read write head section 10, for example, the cladding 17 made of similar material to the cladding 31U is formed to cover the entire upper surface of the write head section 16.

The light source unit 50 provided at the backward of the magnetic read write head section 10 includes a laser diode 60 as a light source emitting laser light, and a rectangular-solid supporting member 51 supporting the laser diode 60, for example, as illustrated in FIG. 4.

The supporting member 51 is formed of, for example, a ceramic material such as $Al_2O_3$.TiC. As illustrated in FIG. 4, the supporting member 51 includes a bonding surface 51A to be adhered to a back surface 11B of the slider 11, and a light source mounting surface 51C orthogonal to the bonding surface 51A. The light source mounting surface 51C is parallel to the element forming surface 11A, and the laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based laser diodes, may be used as the laser diode 60. The wavelength of the laser light emitted from the laser diode 60 may be any value within the range of, for example, 375 nm to 1.7 µm. Specifically, examples of such a laser diode include a laser diode of InGaAsP/InP quaternary mixed crystal with the emission wavelength region of 1.2 to 1.67 µm. As illustrated in FIG. 4, the laser diode 60 has a multilayer structure including a lower electrode 61, an active layer 62, and an upper electrode 63. For example, an n-type semiconductor layer 65 including n-type AlGaN is inserted between the lower electrode 61 and the active layer 62, and for example, a p-type semiconductor layer 66 including p-type AlGaN is inserted between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an aperture for emitting laser light is provided at a position including an emission center 62A of the active layer 62. The relative positions of the light source unit 50 and the magnetic read write head section 10 are fixed by adhering the bonding surface 51A of the supporting member 51 to the back surface 11B of the slider 11 so that the emission center 62A and the rear end surface 32A of the waveguide 32 are coincident with each other. The thickness $T_{LA}$ of the laser diode 60 is, for example, within a range of about 60 to 200 µm. A predetermined voltage is applied between the lower electrode 61 and the upper electrode 63 so that laser light is emitted from the emission center 62A of the active layer 62, and then enters the rear end surface 32A of the waveguide 32. The laser light emitted from the laser diode 60 is preferably polarized light of TM mode whose electric field oscillates in a direction perpendicular to the surface of the active layer 62. The laser diode 60 may be driven with use of a power source in the magnetic disk unit. The magnetic disk unit generally includes a power source generating a voltage of about 2 V, for example, and the voltage generated by the power source is sufficient to drive the laser diode 60. In addition, the laser diode 60 consumes power of about several tens mW, which may be sufficiently covered by the power source in the magnetic disk unit.

Figure 6:
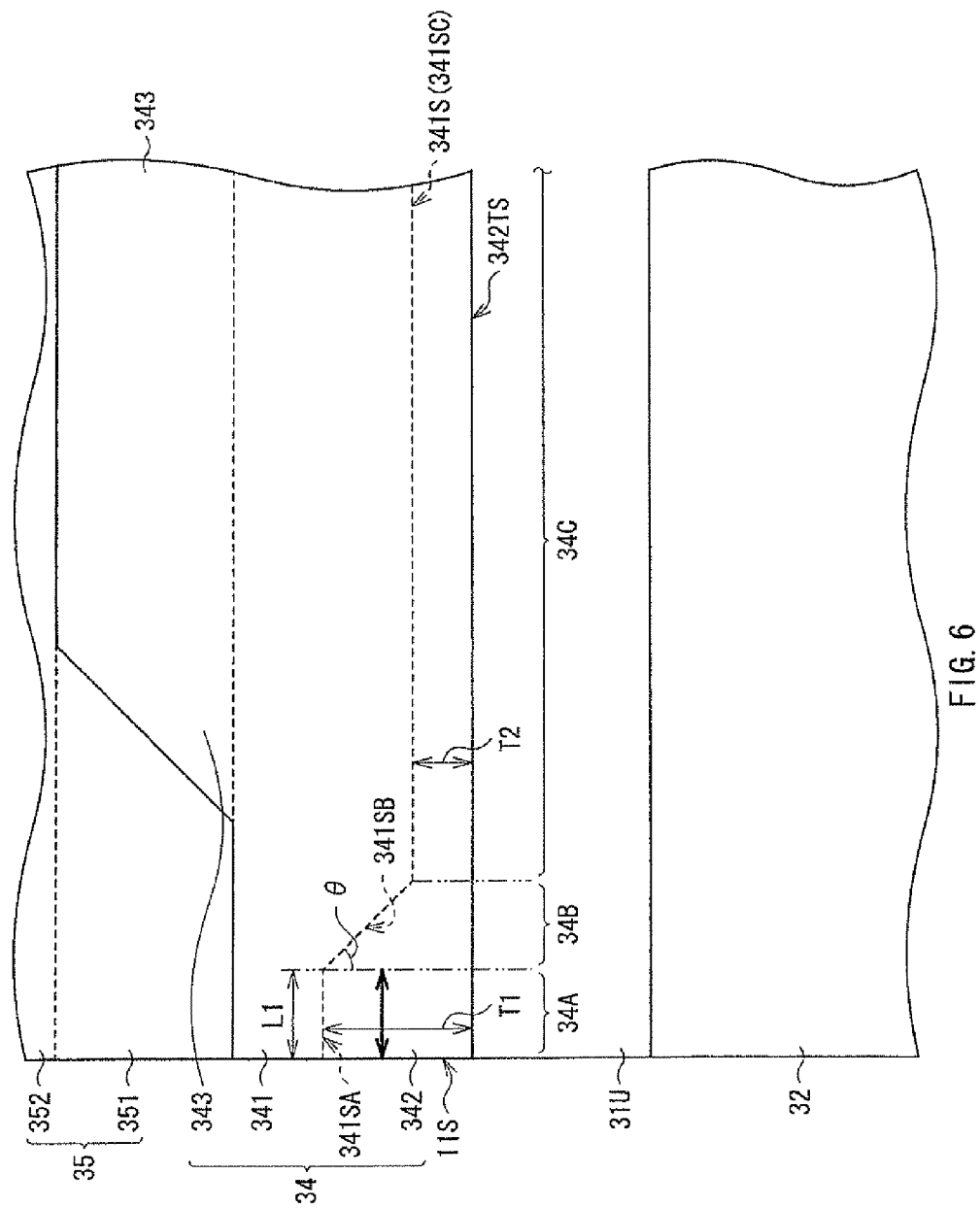
FIG. 6 is a sectional view illustrating, in an enlarged manner, the write head section illustrated in FIG. 4.
Figure 7:
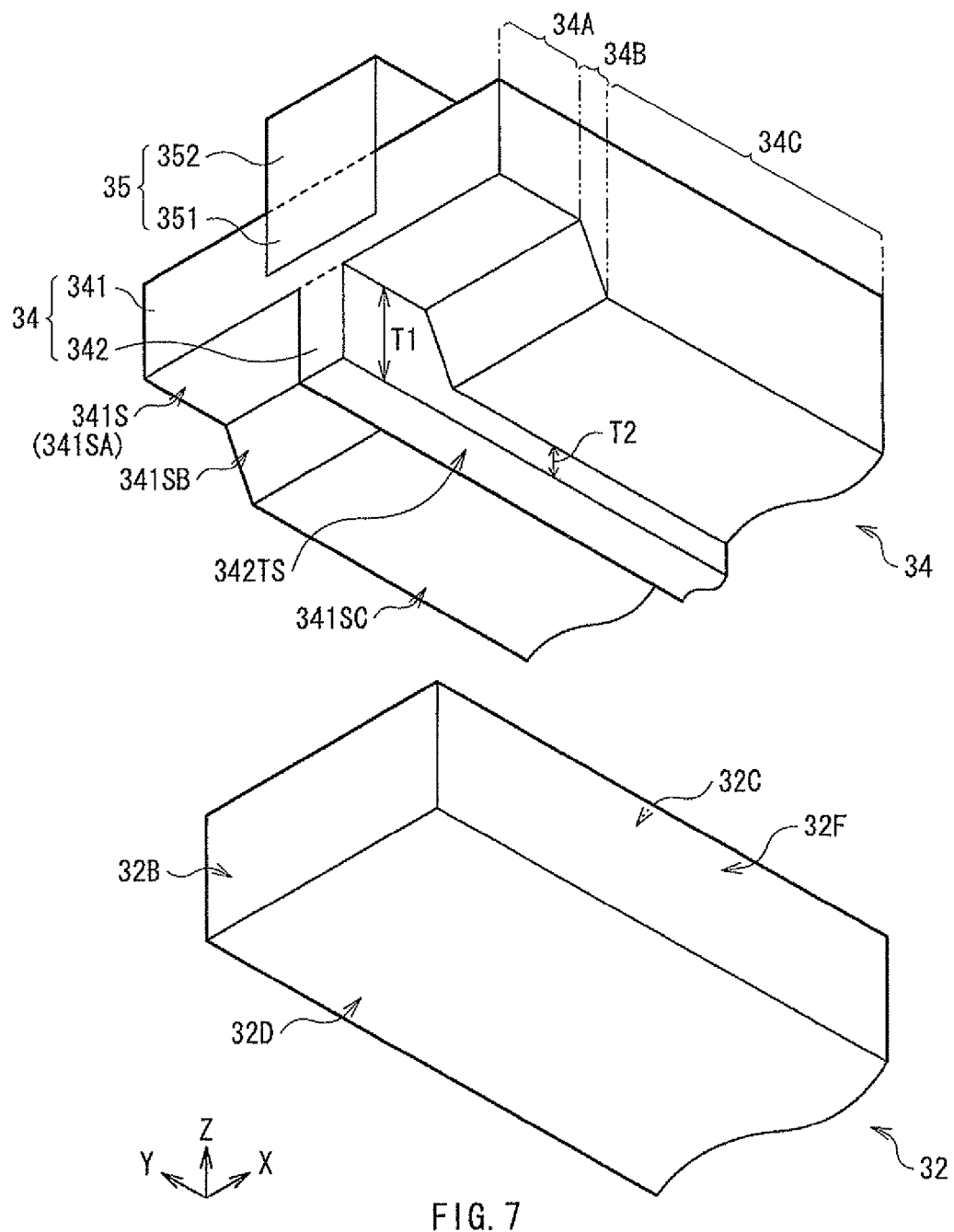
FIG. 7 is a perspective view illustrating a detailed structure of a plasmon generator illustrated in FIG. 6.
Figure 8:
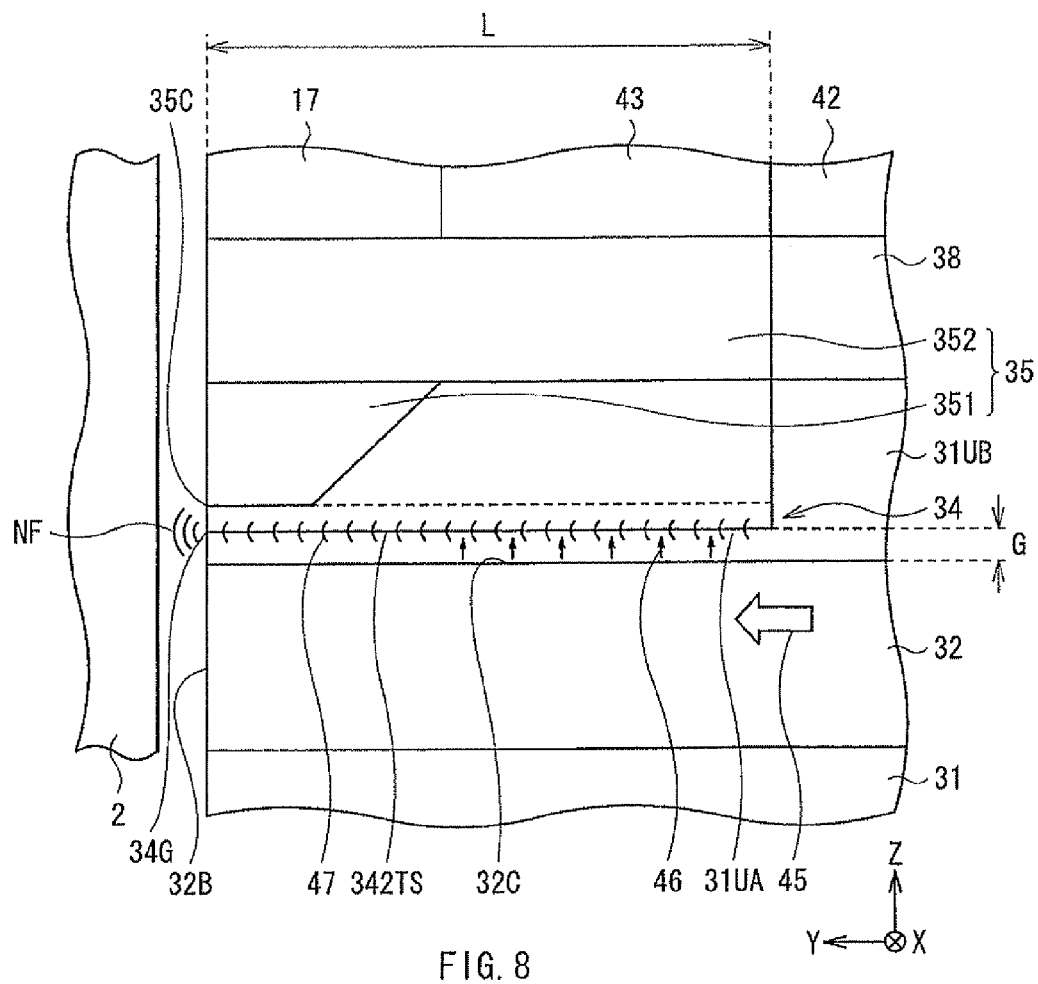
FIG. 8 is an explanatory diagram for explaining functions of a magnetic read write head section.

Next, referring to FIG. 6 to FIG. 8 in addition to FIG. 5, the configuration and the functions of each of the waveguide 32, the plasmon generator 34, and the magnetic pole 35 will be described in detail. FIG. 6 is an enlarged sectional view illustrating a part (near the plasmon generator 34 described later) of FIG. 5, and FIG. 7 is a perspective view illustrating the detail of the structure of the plasmon generator. Incidentally, in FIG. 6 and FIG. 7, the gap between the plasmon generator 34 and the waveguide 32 is illustrated to be wider than actual gap, in order to avoid complications, for the sake of explaining the structure of the plasmon generator 34. In addition, FIG. 8 is a sectional view illustrating the configurations and the functions of the waveguide 32, the plasmon generator 34, and the magnetic pole 35, and the illustrated cross-section is orthogonal to the ABS 11S.

As illustrated in FIG. 5 and FIG. 7, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light based on the laser light propagating through the waveguide 32. In FIG. 4, although the case where the end surface 32B arranged on the ABS 11S is exemplified, the end surface 32B may be arranged at a position (receded position) distanced backward from the ABS 11S.

As illustrated in FIG. 5 to FIG. 7, the plasmon generator 34 has a base 341 extending along an XY plane, and a projection 342. The projection 342 stands partially on a surface 341S of the base 341, which faces the evanescent light generating surface 32C of the waveguide 32, to project toward the waveguide 32, and the projection 342 extends in the Y-axis direction. In addition, at a position receded from the ABS 11S of the base 341 opposite from the projection 342, an additional portion 343 with a predetermined thickness is provided. The additional portion 343 functions to improve heat dissipation of the plasmon generator 34.

The projection 342 is provided at a position overlapped, in a down-track direction (the Z-axis direction), with the magnetic pole 35. In particular, in the X-axis direction, the central position of the magnetic pole desirably corresponds to the center position of the projection 342. Moreover, the plasmon generator 34 is segmented into a front portion 34A, a mid-portion 34B, and a rear portion 34C in order from the ABS 11S backward in the Y-axis direction. The projection 342 has a rectangular or trapezoidal shape on the XZ cross-section. In this case, the shape of the XZ cross-section of the projection 342 is desirably uniform irrespective of the distance from the ABS 11S, in each of the front portion 34A and the rear portion 34C. Examples of the constituent material of the plasmon generator 34 include conductive materials including one or more of Pd (palladium), Pt (platinum), Rh (rhodium), Ir (iridium), Au (gold), Ag (silver), Cu (copper), and Al (aluminum). Here, the constituent materials of the base 341 and the projection 342 may be the same kind or different kinds.

A step T1 between a top 342TS of the projection 342 and the surface 341S (341SA) of the base 341 in the front portion 34A is larger than a step T2 between the top 342TS and the surface 341S (341SC) in the rear portion 34C. In this case, the step T2 is desirably larger than zero (namely, the top 342TS is projected from the surface 341S even in the rear portion 34C) because the obtained spot size of the near-field light NF may be suppressed from increasing. In addition, the step T2 is desirably equal to or smaller than 30 nm because generation efficiency of the near-field light NF is increased. On the other hand, preferably, the step T1 is larger than the step T2 and is equal to or smaller than 50 nm. Moreover, the length L1 of the front portion 34A in the Y-axis direction is, for example, larger than 0 nm and equal to or smaller than 40 nm.

Furthermore, in the surface 341S, a surface 341SB corresponding to the mid-portion 34B is inclined. In other words, in the mid-portion 34B, the step between the top 342TS and the surface 341SB is equal to the step T1 at a boundary with the front portion 34A, is decreased toward the rear portion 34C from the boundary, and is equal to the step T2 at a boundary with the rear portion 34C. Note that the surface 341SB defines an angle θ relative to the ABS 11S. The angle θ may be 0° (namely, the surface 341SB is parallel to the ABS 11S), but desirably, is larger than 0° and equal to or smaller than 40°, for example. This is because heat dissipation is secured, the temperature rise of the plasmon generator 34 is suppressed, and the obtained spot size of the near-field light is further decreased. In addition, desirably, the top 342TS of the projection 342 is flat, and the steps T1 and T2 are uniform in the Y-axis direction.

The magnetic pole 35 is provided to be in contact with the plasmon generator 34. More specifically, as illustrated in FIG. 5 to FIG. 7, the magnetic pole 35 has a first portion 351 embedded in the base 341 of the plasmon generator 34, and a second portion 352 which is coupled to an upper surface of the first portion 351 and directly covers the plasmon generator 34. Note that the additional portion 343 provided on the upper surface of the base 341 is disposed at the rear of the first portion 351. Moreover, the magnetic pole 35 has an end surface 35T exposed at the ABS 11S. The end surface 35T includes an end surface 351T of the first portion 351 and an end surface 352T of the second portion 352.

As illustrated in FIG. 8, in the cladding 31U, a portion arranged between the evanescent light generating surface 32C and the top 342TS corresponds to a buffer portion 31UA. In the cladding 31U, a portion located at the rear of the plasmon generator 34 and the first portion 351 corresponds to a rear portion 31UB.

[3. Functions of Magnetic Read Write Head Section]

Next, functions of the magnetic read write head section 10 with the above-described configuration is described with reference to FIG. 8. As illustrated in FIG. 8, at the time of performing writing into the magnetic recording layer of the magnetic disc 2 by the write head section 16, first, the laser light 45 emitted from the laser diode 60 of the light source unit 50 propagates through the waveguide 32, and reaches near the buffer portion 31UA which is sandwiched between the plasmon generator 34 and the waveguide 32. Herein, the laser light 45 is totally reflected by the evanescent light generating surface 32C, which is an interface between the waveguide 32 and the buffer portion 31UA, so that evanescent light 46 leaking into the buffer portion 31UA is excited. After that, the evanescent light 46 couples with fluctuation of charge which is excited at the top 342TS of the projection 342 of the plasmon generator 34 to induce a surface plasmon polariton mode, and therefore surface plasmons are excited. Incidentally, to be precise, in this system is, since the surface plasmon as elementary excitation couples with an electromagnetic wave, excited is a surface plasmon polariton. However, hereinafter, the surface plasmon polariton is abbreviated as a surface plasmon. Induction of the surface plasmon mode is possible by setting the refractive index of the buffer portion 31UA to be smaller than that of the waveguide 32, and appropriately selecting the length of the buffer portion 31UA in the Y-axis direction, that is, the length L of the coupling portion between the waveguide 32 and the plasmon generator 34, and the thickness (gap G between the waveguide 32 and the projection 342) of the buffer portion 31UA in the Z-axis direction. In the induced surface plasmon mode, the surface plasmons 47 are excited at the top 342TS of the projection 342, and then propagate on the top 342TS toward the ABS 11S. The surface plasmons 47 eventually reach a tip portion 34G (a tip portion closest to the ABS 11S of the top 342TS) of the plasmon generator 34. As a result, at the tip portion 34G, the surface plasmons 47 are collected, and near-field light NF is generated from the tip portion 34G, based on the surface plasmons 47. The near-field light NF is applied to the magnetic disk 2, reaches the surface of the magnetic disk 2, and heats a part of the magnetic recording layer of the magnetic disk 2. Therefore, anisotropic magnetic field (coercivity) at the part is decreased to a value which enables writing, and thus writing is performed at that part by applied recording magnetic field.

[4. Method of Manufacturing Magnetic Read Write Head]

Figure 9:
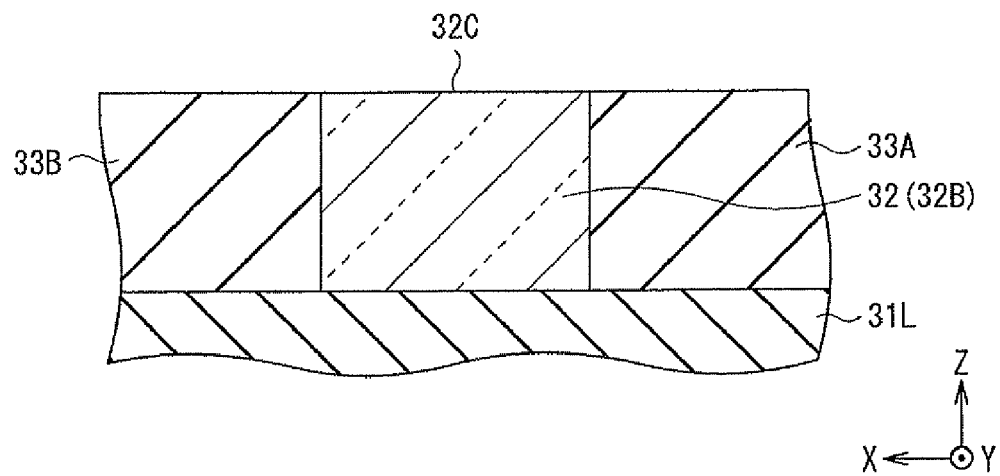
FIG. 9 is a sectional view for explaining manufacturing processes of a main part of the magnetic read write head.
Figure 10:
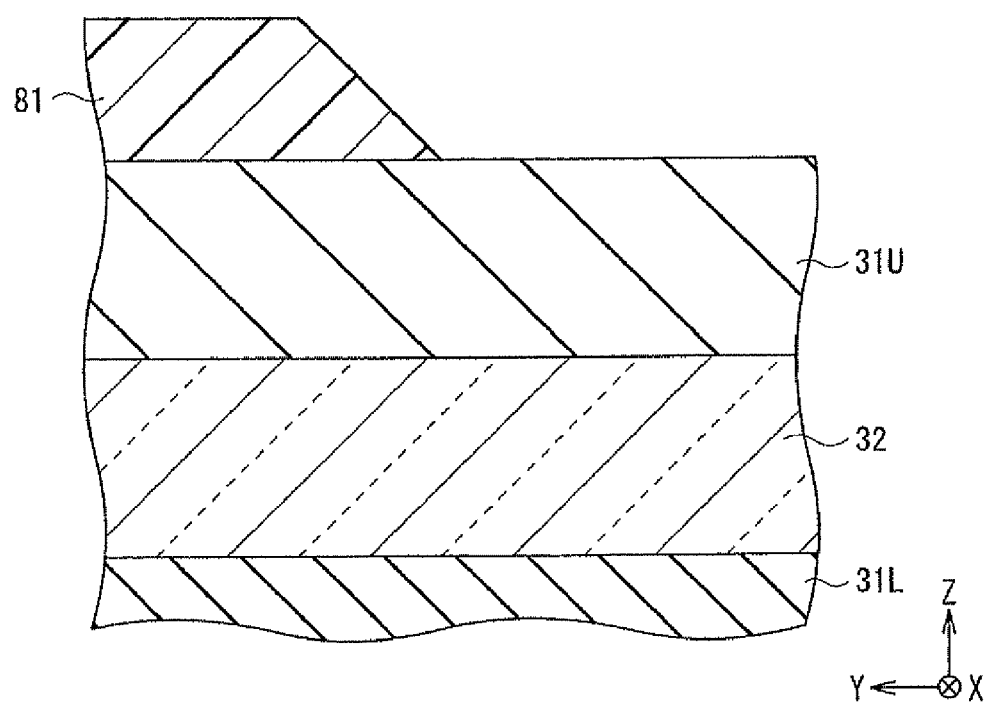
FIG. 10 is a sectional view for explaining a process following the process of FIG. 9.
Figure 11:
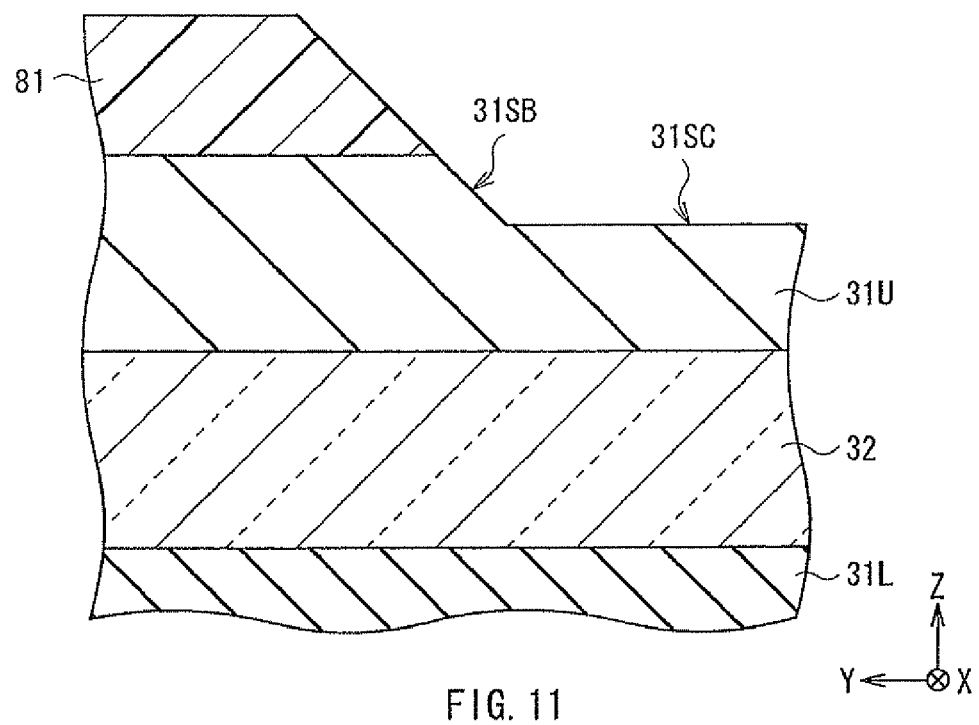
FIG. 11 is a sectional view for explaining a process following the process of FIG. 10.

In addition to FIG. 4, referring to FIG. 9 to FIG. 15, a method of manufacturing the magnetic read write head section 10 will be described. FIG. 9 and FIG. 12 to FIG. 15 each illustrate a configuration of a cross-section which eventually becomes the ABS 11S, for explaining formation processes of a main part of the magnetic read write head section 10. In addition, FIG. 10 and FIG. 11 illustrate a configuration of a cross-section orthogonal to a surface which eventually becomes the ABS 11S. In the following description, first, an outline of the entire manufacturing process will be described with reference to FIG. 4, and then formation processes of the main part (the cladding 33, the plasmon generator 34, the magnetic pole 35, and the cladding 17) will be described in detail with reference to FIG. 9 to FIG. 15. At that time, since the details of the materials, the structures, and the like of the components have been already described, the description thereof will be omitted as appropriate.

The magnetic read write head section 10 is mainly manufactured by sequentially forming and stacking a series of components by using an existing thin film process. Examples of the existing thin film process include film forming techniques such as an electrolytic plating and a sputtering, patterning techniques such as a photolithography, etching techniques such as dry etching and wet etching, and polishing techniques such as chemical mechanical polishing (CMP).

Herein, first, the insulating layer 13 is formed on the slider 11. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the cladding 31, the waveguide 32, the cladding 33, the plasmon generator 34, the magnetic pole 35, and the connecting layers 36 and 37 are formed in order on the insulating layer 27. Note that the formation of the leading shield 29 may be omitted. Further, by performing a planarization process after the insulating layer 38 is formed to cover the entire surface, the upper surfaces of the magnetic pole 35, the insulating layer 38, and the connecting layer 37 are planarized. Subsequently, the coil 41 embedded in the insulating layers 39 and 42 is formed. Moreover, the upper yoke layer 43 connected with the magnetic pole 35 and the connecting layer 37 is formed to complete the write head section 16. After that, the cladding 17 is formed on the write head section 16, and by using CMP method or the like, the side surface of the stacked structure from the slider 11 to the cladding layer 17 is totally polished to form the ABS 11S. As a result, the magnetic read write head section 10 is completed.

When the main part of the magnetic read write head section 10 is formed, first, a dielectric layer (not illustrated) is formed to cover the waveguide 32 provided on the cladding 31. The dielectric layer becomes a part of the cladding 33 later, and is formed of the above-described predetermined dielectric materials. After that, the dielectric layer is polished by using CMP method or the like until the upper surface (that is, the evanescent light generating surface 32C) of the waveguide 32 is exposed, to form the flat surface. Accordingly, as illustrated in FIG. 9, the waveguide 32 and a pair of claddings 33A and 33B which sandwich the waveguide 32 in the track-width direction are formed on the upper surface of the cladding 31L. Alternatively, the dielectric layer is formed on the cladding 31L in first, and a pair of claddings 33A and 33B is formed by providing a through hole reaching the upper surface of the cladding 31L on the dielectric layer, and then the waveguide 32 may be formed to fill the through hole.

Next, as illustrated in FIG. 10, with use of the above-described predetermined dielectric materials, the cladding 31U is formed to cover a flat surface which are defined by the waveguide 32 and the pair of claddings 33A and 33B. The upper surface of the cladding 31U is subjected to planarization process as needed. After that, an etching mask 81 made of, for example, photoresist is formed to cover a portion corresponding to the front portion 34A on the cladding 31U.

Subsequently, as illustrated in FIG. 11, an exposed portion (portions corresponding to the mid-portion 34B and the rear portion 34C) of the cladding 31U is selectively dug down by, for example, reactive ion etching, to form the surface 31SB and the surface 31SC. In this case, the surface 31SB is an inclined plane having an angle matching to that of the surface 341SB which is formed later. The surface 31SC is a flat plane connected with the surface 31SB and extending backward.

Figure 12:
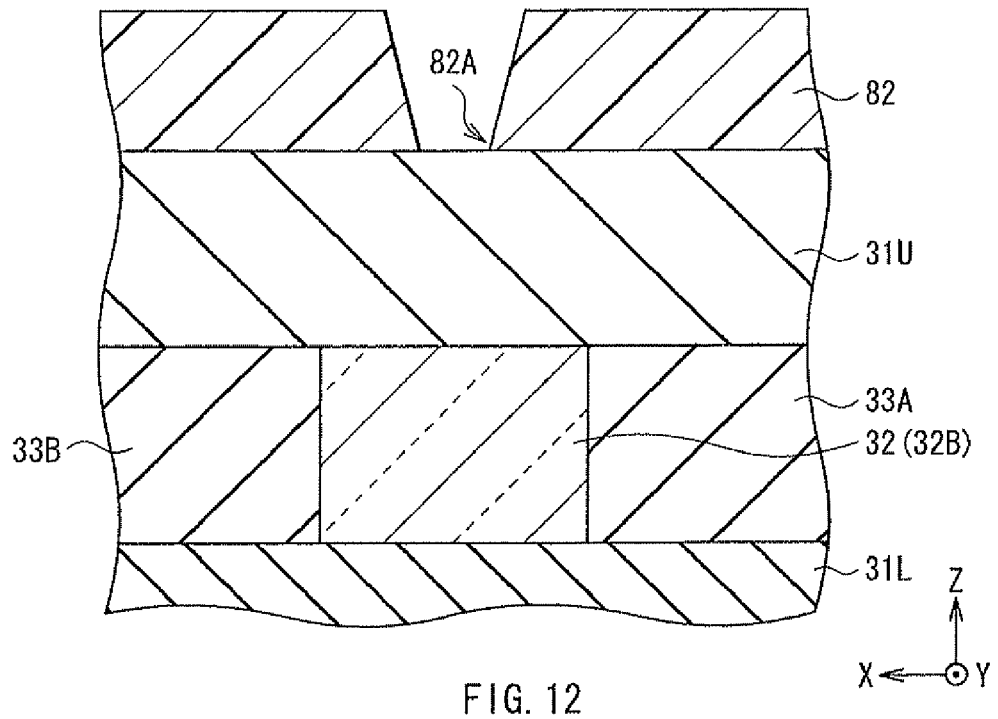
FIG. 12 is a sectional view for explaining a process following the process of FIG. 11.

After the etching mask 81 is removed, an etching mask 82 made of, for example, photoresist is formed on the cladding 31U as illustrated in FIG. 12. The etching mask 82 has an aperture 82A extending in the Y-axis direction. The aperture 82A has a size slightly larger than the width of the projection 342 of the plasmon generator 34, which is formed later.

Figure 13:
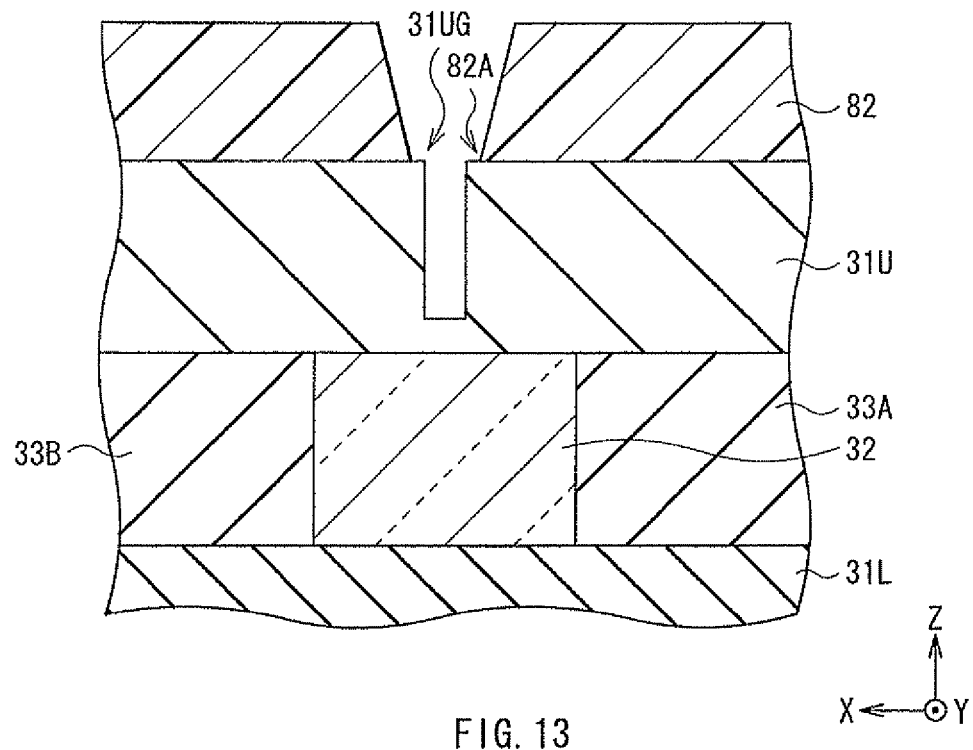
FIG. 13 is a sectional view for explaining a process following the process of FIG. 12.

Then, as illustrated in FIG. 13, a portion (exposed portion) corresponding to an aperture 82A of the cladding 31U is dug down by, for example, reactive ion etching, to form a groove 31UG having a rectangular or trapezoidal cross-section, in the cladding 31U. The groove 31UG is formed so that the bottom thereof is close to the upper surface (that is, the evanescent light generating surface 32C) of the waveguide 32.

Figure 14:
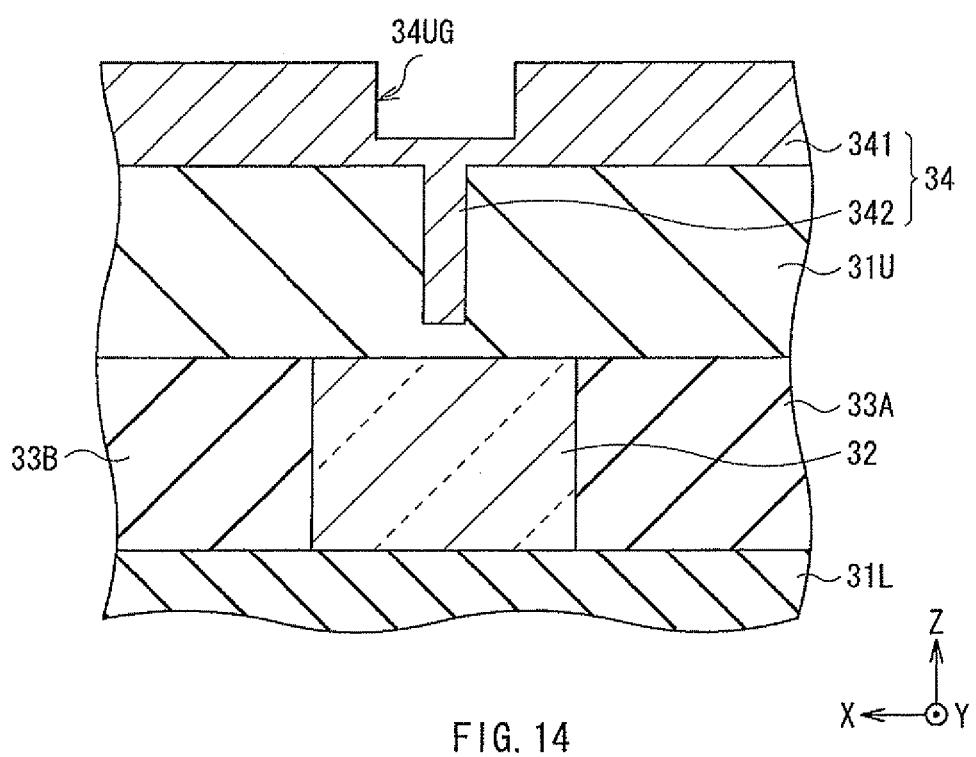
FIG. 14 is a sectional view for explaining a process following the process of FIG. 13.

Subsequently, as illustrated in FIG. 14, after the etching mask 82 is lifted off, a metal layer, which eventually becomes the plasmon generator 34, is formed to cover the upper surface of the entire structure including the groove 31UG by, for example, sputtering or ion beam deposition (IBD) method. After the metal layer is patterned, a groove 34UG is formed by selectively digging down a part of the upper surface, and therefore the predetermined-shaped plasmon generator 34 having the base 341 and the projection 342 is completed.

Figure 15:
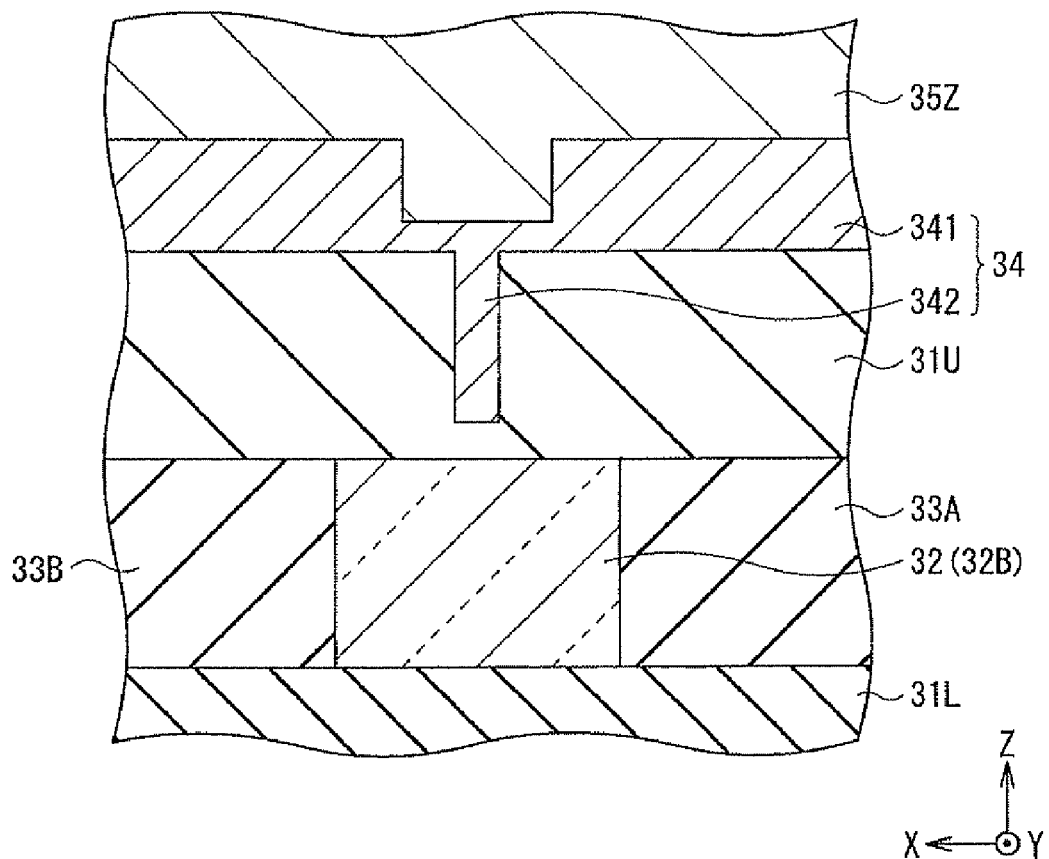
FIG. 15 is a sectional view for explaining a process following the process of FIG. 14.

Furthermore, as illustrated in FIG. 15, for example, by sputtering or IBD method, a plating base film (not illustrated) used for forming the magnetic pole 35 is formed to cover the plasmon generator 34. Then, by plating with use of the plating base film, a plating film 35Z is formed to cover the upper surface of the entire structure including the groove 34UG of the plasmon generator 34. After that, the plating film 35Z is patterned to form the predetermined-shaped magnetic pole 35. Finally, the cladding 17 is formed by sputtering, for example. In this way, the main part of the magnetic read write head section 10 is completed.

[5. Effects of Magnetic Read Write Head and Magnetic Disk Unit]

In the embodiment, the plasmon generator 34 is provided with the projection 342 which stands partially on the surface 341S of the base 341 to project toward the waveguide 32 and has a rectangular or trapezoidal cross-section. Therefore, light density of the near-field light NF generated from the tip portion 34G is allowed to be increased, and the spot size of the near-field light NF is allowed to be decreased accordingly. Thus, it is possible to increase recording density. Moreover, in the plasmon generator 34, heat is generated near the tip portion 34G due to the generation of the near-field light NF. The heat propagates from the projection 342 to the plate-like base 341, and is then efficiently output to the outside. As a result, it is possible to suppress excessive temperature rise of the plasmon generator 34, and to avoid unnecessary projection of the tip portion 34G and significant deterioration of the light use efficiency in the plasmon generator 34. In particular, in the embodiment, the step T1 between the top 342TS and the surface 341SA in the front portion 34A is made larger than the step T2 between the top 342TS and the surface 341SC in the rear portion 34C. Therefore, the spot size of the near-field light NF is allowed to be further decreased. On the other hand, in the rear portion 34C, the provided step T2 is smaller than that in the front portion 34A. Therefore, while the spot size is prevented from increasing, heat dissipation itself is allowed to be increased. As a result, magnetic recording is allowed to be performed more efficiently, and characteristic deterioration due to heat generation is prevented to secure high reliability. Note that when the step T2 is made 30 nm or less, for example, the generation efficiency of the near-field light NF is allowed to be further improved.

Second Embodiment

Next, a magnetic disk unit according to a second embodiment of the invention is described. The magnetic disk unit in the second embodiment is similar to that in the above-described first embodiment except that a write head section 70 is provided in place of the write head section 16. Therefore, the description of the write head section 70 will be made below, and the other description will be appropriately omitted.

Figure 16:
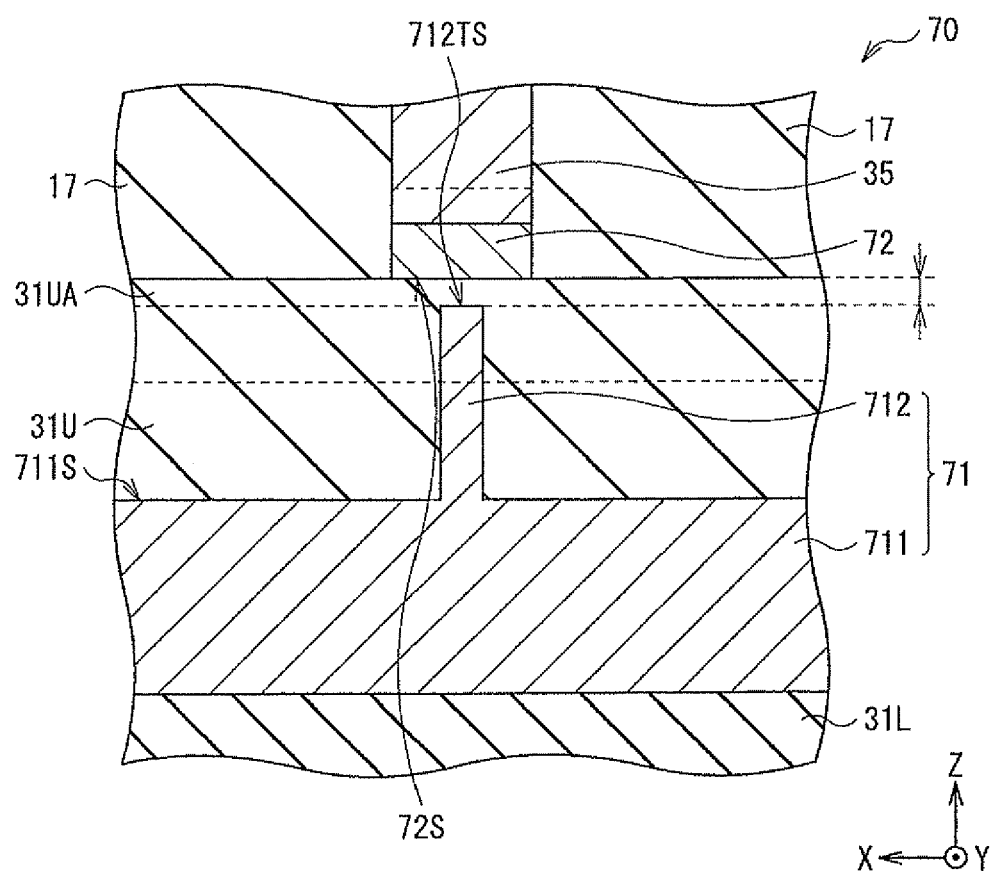
FIG. 16 is a plan view illustrating a configuration of an end surface, exposed at an air bearing surface, of a write head section according to a second embodiment of the invention.
Figure 17:
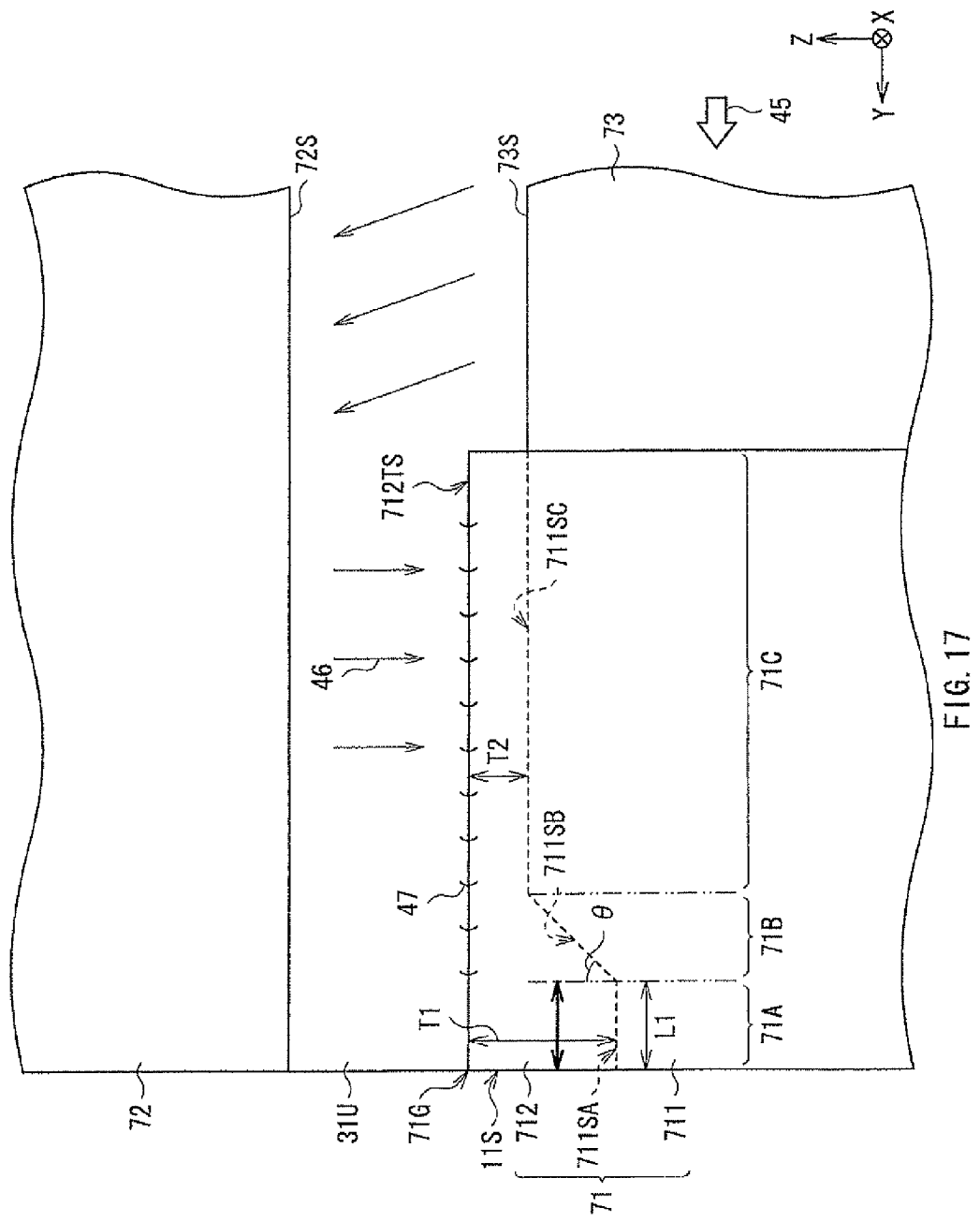
FIG. 17 is a sectional view illustrating, in an enlarged manner, the write head section illustrated in FIG. 16.
Figure 18:
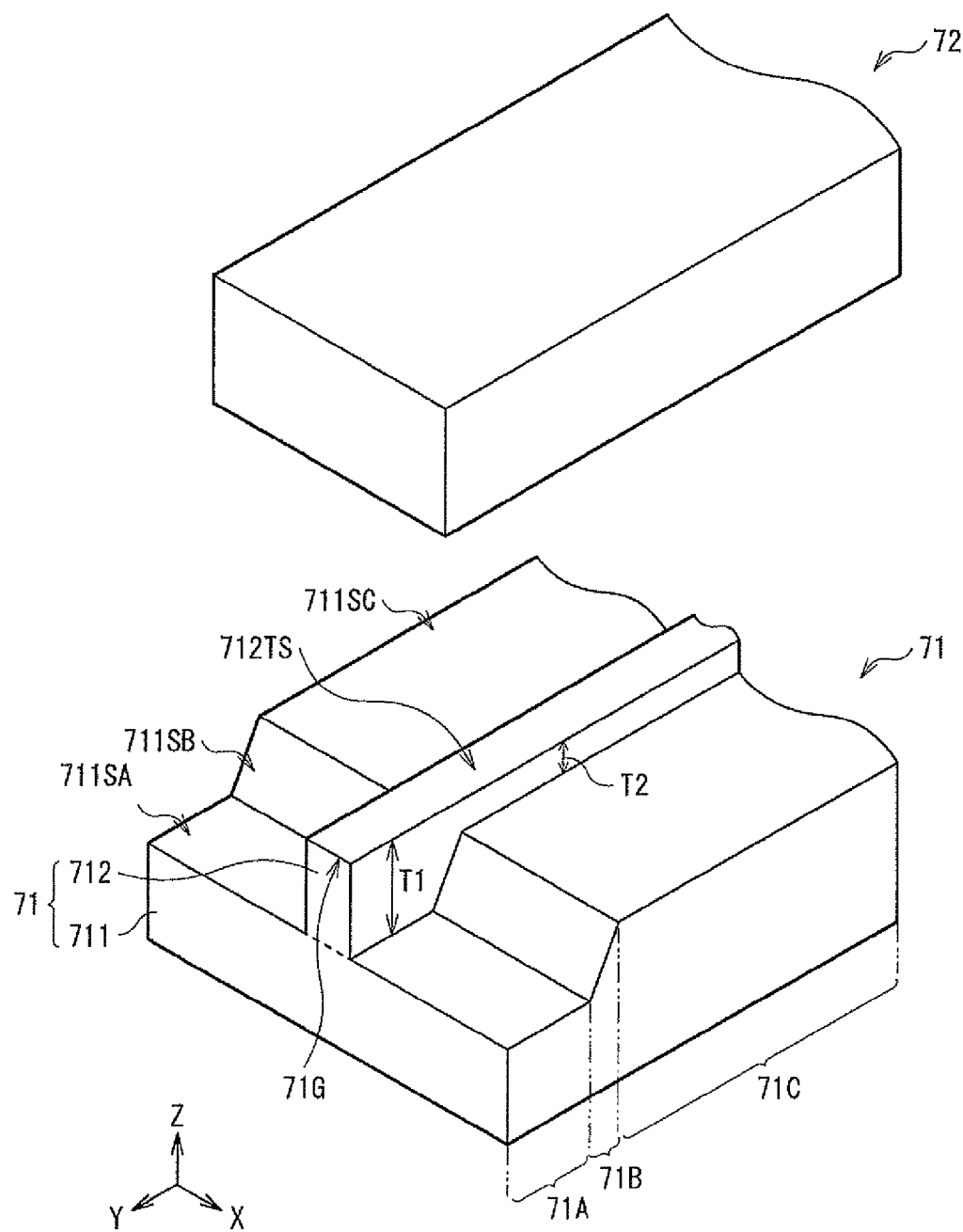
FIG. 18 is a perspective view illustrating a detailed structure of a plasmon generator illustrated in FIG. 17.

FIG. 16 illustrates a part of an end surface of the write head section 70 exposed at the ABS 11S in an enlarged manner. In addition, FIG. 17 is an enlarged sectional view illustrating a part of FIG. 16, and FIG. 18 is a perspective view illustrating detail of the structure of the plasmon generator. FIG. 16 to FIG. 18 correspond to FIG. 5 to FIG. 7 in the above-described first embodiment, respectively.

In the write head section 70, a plasmon generator 71 has an end exposed at the ABS 11S, and is arranged to face the magnetic pole 35 with a distance in the Z-axis direction. Between the plasmon generator 71 and the magnetic pole 35, a metal layer 72 is provided to be in contact with the magnetic pole 35, for example. In addition, as illustrated in FIG. 17, a waveguide 73 is disposed at the rear of the plasmon generator 71, and a surface 73S of the waveguide 73 partially faces a surface 72S of the metal layer 72. Moreover, in the surface 73S, a portion near the ABS 11S faces a top 712TS (described later) of a projection 712 of the plasmon generator 71.

The plasmon generator 71 has a base 711 extending along the XY-plane, and the projection 712. The projection 712 stands partially on the surface 711S of the base 711, facing the surface 72S of the metal layer 72, and extends in the Y-axis direction.

The projection 712 is provided at a position overlapped, in the Z-axis direction, with the magnetic pole 35. In particular, in the X-axis direction, the center position of the magnetic pole 35 desirably corresponds to the center position of the projection 712. Moreover, the plasmon generator 71 is segmented into a front portion 71A, a mid-portion 71B, and a rear portion 71C in order from the ABS 11S backward in the Y-axis direction. The projection 712 has a rectangular or trapezoidal cross-section in the XZ plane. Herein, the shape of the XZ cross-section of the projection 712 is desirably uniform irrespective of a distance from the ABS 11S in each of the front portion 71A and the rear portion 71C. The constituent material of the plasmon generator 71 is similar to that of the plasmon generator 34. The constituent materials of the base 711 and the projection 712 may be the same kind or different kinds.

A step T1 between the top 712TS of the projection 712 and the surface 711S (711SA) of the base 711 in the front portion 71A is larger than a step T2 between the top 712TS and the surface 711S (711SC) in the rear portion 71C. The step T2 is desirably larger than zero (namely, the top 712TS is projected from the surface 711S even in the rear portion 71C) because the obtained spot size of the near-field light NF may be suppressed from increasing.

In addition, in the surface 711S, the surface 711SB corresponding to the mid-portion 71B is inclined. In other words, in the mid-portion 71B, the step between the top 712TS and the surface 711SB is equal to the step T1 at a boundary with the front portion 71A, is decreased toward the rear portion 71C from the boundary, and is equal to the step T2 at a boundary with the rear portion 71C. Note that the surface 711SB defines an angle θ relative to the ABS 11S. Moreover, desirably, the top 712TS of the projection 712 is flat, and the steps T1 and T2 are uniform in the Y-axis direction.

The metal layer 72 is a plate-like member extending in the Y-axis direction and facing the top 712TS of the plasmon generator 71 and the surface 73S of the waveguide 73. For example, the metal layer 72 is formed of noble metals such as Au, Ag, and Cu and magnetic alloys such as FeCo alloy and FeNi alloy.

Even in the magnetic read write head section 10 having such a write head section 70, writing into the magnetic recording layer of the magnetic disk 2 is performed similarly to the above-described first embodiment. At this time, first, laser light 45 emitted from the laser diode 60 of the light source unit 50 propagates through the waveguide 73, and reaches near the boundary with the plasmon generator 71. In this case, after the laser light 45 is coupled with the metal layer 72, evanescent light 46 leaking into the buffer portion 31UA which is sandwiched between the metal layer 72 and the top 712TS of the projection 712 is excited. After that, the evanescent light 46 couples with fluctuation of charge which is excited at the top 712TS of the projection 712 to induce a surface plasmon polariton mode, and therefore surface plasmons are excited. In the induced surface plasmon mode, the surface plasmons 47 are excited at the top 712TS of the projection 712, and then propagates on the top 712TS toward ABS 11S. The surface plasmons 47 eventually reach a tip portion 71G of the plasmon generator 71. As a result, at the tip portion 71G, the surface plasmons 47 are collected, and the near-field light NF is generated from the tip portion 71G based on the surface plasmons 47. The near-field light NF is applied to the magnetic disk 2, reaches the surface of the magnetic disk 2, and heats a part of the magnetic recording layer of the magnetic disk 2. Accordingly, anisotropic magnetic field (coercivity) at the part is decreased to a value which enables writing, and thus writing is performed at that part by applied recording magnetic field.

In the embodiment, similarly to the above-described first embodiment, the plasmon generator 71 is provided with the base 711 and the projection 712, which stands partially on the surface 711S of the base 711 to project toward the metal layer 72 and has a rectangular or trapezoidal cross-section. In addition, the step T1 in the front portion 71A is made larger than the step T2 in the rear portion 71C. Accordingly, effects similar to those in the above-described first embodiment are obtainable.

EXAMPLES

Examples of the present invention will be described in detail.

Examples 1-1 to 1-4

Figure 19:
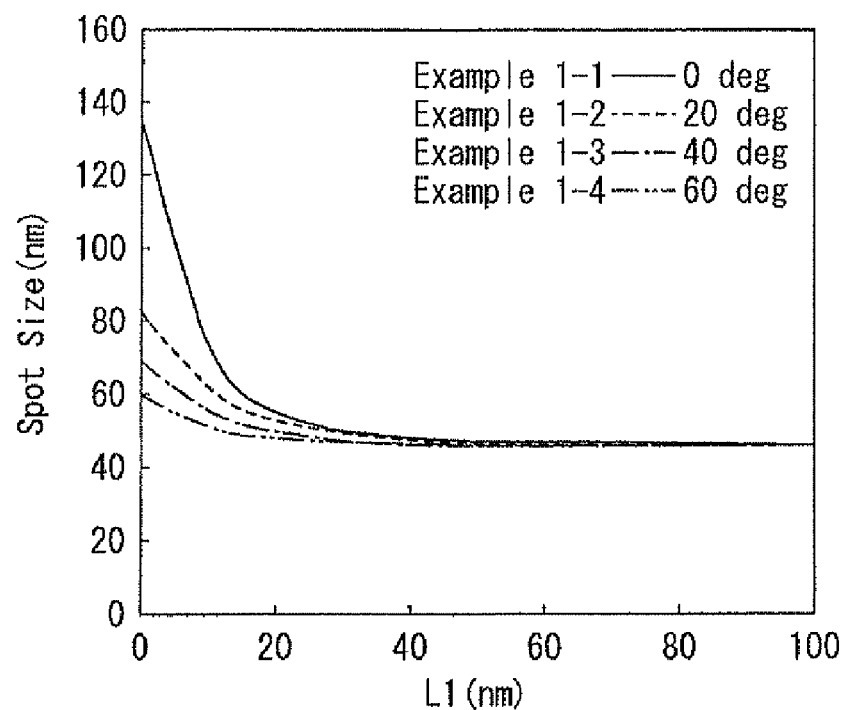
FIG. 19 is a characteristic diagram illustrating a relationship between a length of a front portion of a plasmon generator and a spot size, in Examples 1-1 to 1-4.
Figure 20:
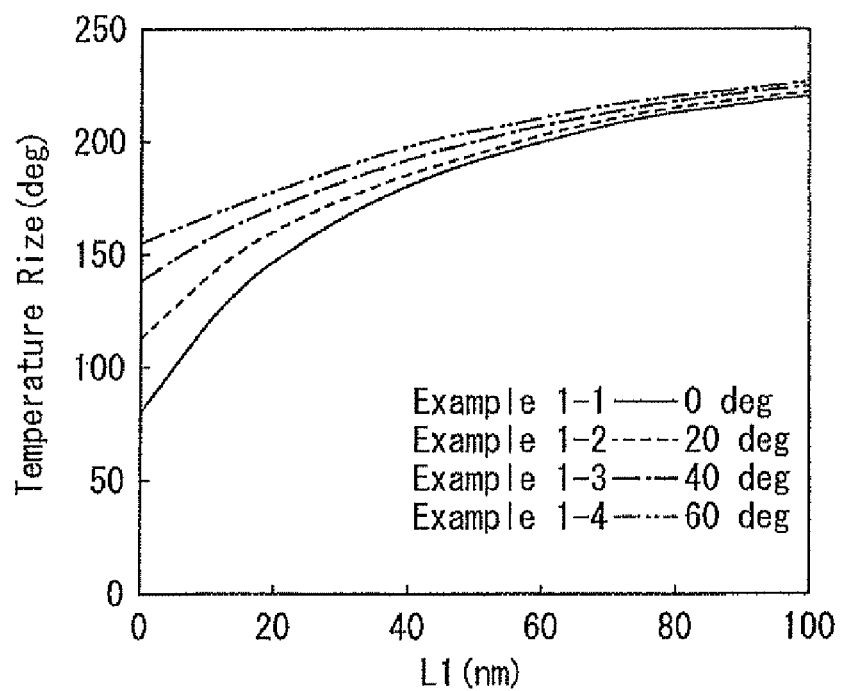
FIG. 20 is a characteristic diagram illustrating a relationship between the length of the front portion of the plasmon generator and a temperature of the plasmon generator, in Examples 1-1 to 1-4.

As for the write head section 16 in the magnetic read write head section 10 as the above-described embodiments, a relationship between the length L1 (nm) of the front portion 34A in the Y-axis direction and the spot size (nm) of the near-field light NF, and a relationship between the length L1 (nm) and the temperature (C°) of the tip portion 34G of the projection 342 were calculated by simulation. The results are illustrated in FIG. 19 and FIG. 20. Herein, it was assumed that the angle θ of the surface 341SB was 0° (Example 1-1), 20° (Example 1-2), 40° (Example 1-3), and 60° (Example 1-4), and other conditions were common between Examples 1-1 and 1-4. Specifically, the wavelength of the laser light 45 was 800 nm, the step T1 was 40 nm, the step T2 was 20 nm, and the gap G (see FIG. 8) between the projection 342 and the waveguide 32 was 25 nm. In addition, the temperature of the tip portion 34G was calculated under the condition in which the surface temperature of the magnetic disk 2 was 350° C.

As illustrated in FIG. 19, when the length L1 was within a range of about 0 to 40 nm, there was a tendency that the spot size was large as the length L1 was shorter, and the spot size was large as the angle θ was larger. When the length L1 was equal to or smaller than 10 nm, the spot size was particularly large, and the variation was steep. However, when the length L1 was equal to or larger than 20 nm, the spot size was relatively small and the variation was moderate. In particular, when the length L1 was substantially equal to or larger than 40 nm, the spot size was stably defined at between 40 nm and 50 nm irrespective of the angle θ.

In addition, as illustrated in FIG. 20, the temperature (° C.) of the tip portion 34G simply increased with the increase of the length L1 in any of Examples. At this time, when the angle θ was small, the temperature was low but the gradient of the temperature with the increase of the length L1 was large. On the other hand, when the angle θ was large, the temperature was high but the temperature depending on the length L1 changed gently.

From the above-described results, it is found that the suitable range of the angle θ is larger than 0° and equal to or smaller than 40°.

Examples 2-1 to 2-4

Figure 21:
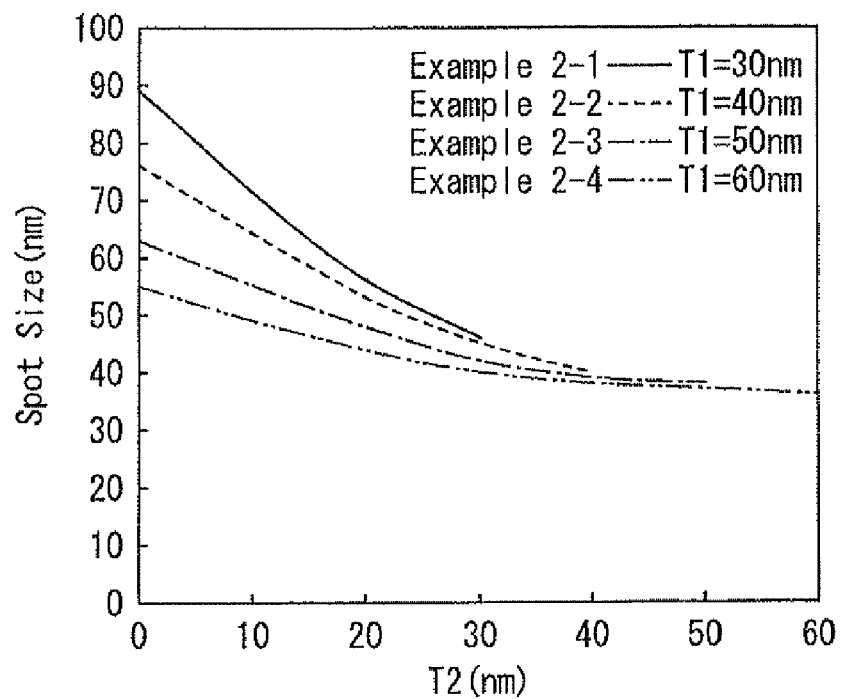
FIG. 21 is a characteristic diagram illustrating a relationship between a step of a front portion of a plasmon generator and a spot size, in Examples 2-1 to 2-4.
Figure 22:
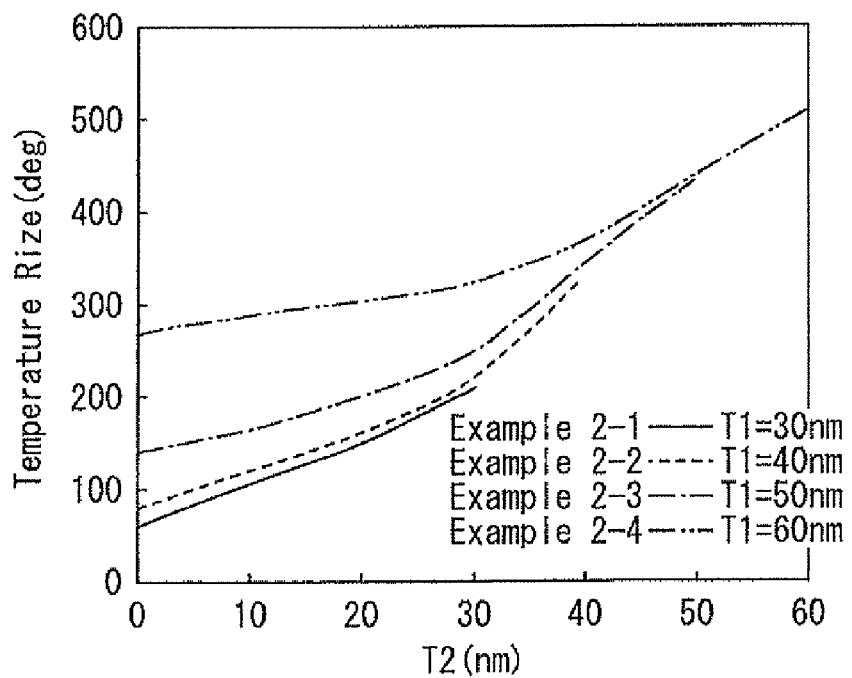
FIG. 22 is a characteristic diagram illustrating a relationship between the step of the front portion of the plasmon generator and a temperature of the plasmon generator, in Examples 2-1 to 2-4.

As for the write head section 16 as the above-described embodiments, a relationship between the step T2 (nm) and the spot size φ (nm) of the near-field light NF, and a relationship between the step T2 (nm) and the temperature (° C.) of the tip portion 34G of the projection 342 were calculated by simulation. The results are illustrated in FIG. 21 and FIG. 22. Herein, it was assumed that the step T1 was 30 nm (Example 2-1), 40 nm (Example 2-2), 50 nm (Example 2-3), and 60 nm (Example 2-4), and other conditions were common between Examples 2-1 and 2-4. Specifically, the wavelength of the laser light 45 was 800 nm, the length L1 of the front portion 34A was 20 nm, the angle θ of the surface 341SB was 20°, and the gap G (see FIG. 8) between the projection 342 and the waveguide 32 was 25 nm. In addition, the temperature of the tip portion 34G was calculated under the condition in which the surface temperature of the magnetic disk 2 was 350° C.

As illustrated in FIG. 21, when the step T2 was within a range of about 0 to 40 nm, there was a tendency that the spot size was large as the step T2 was smaller, and the spot size was large as the step T1 was smaller. However, when the step T2 was equal to or larger than 40 nm, the spot size was about 35 nm, irrespective of the step T1.

In addition, as illustrated in FIG. 22, the temperature (° C.) of the tip portion 34G simply increased with the increase of the step T2 in any of Examples. At this time, the temperature was low as the step T1 was smaller.

From the results described above, it is found that the suitable range of the step T1 is larger than T2 and equal to or smaller than 50 nm, and the suitable range of the step T2 is larger than 0 nm and equal to or smaller than 30 nm.

Examples 3-1 and 3-2

As for the write head section 16 as the above-described embodiments, a relationship between the step T2 (nm) and light efficiency (%) was calculated by simulation. The result is illustrated in FIG. 23. The light efficiency herein means a ratio of the obtained energy of the near-field light NF with respect to the energy of the applied laser light 45. Herein, it was assumed that the wavelength of the laser light 45 was 400 nm (Example 3-1) and 800 nm (Example 3-2), and other conditions were common between Examples 3-1 and 3-2. Specifically, the step T1 was 40 nm, the length L1 of the front portion 34A was 20 nm, the angle θ of the surface 341SB was 20°, and the gap G (see FIG. 8) between the projection 342 and the waveguide 32 was 25 nm.

As illustrated in FIG. 23, when the step T2 was within a range of about 0 to 30 nm, the light efficiency was constant in any of Examples. On the other hand, when the step T2 exceeded 30 nm, the light efficiency rapidly decreased. Accordingly, it is conceivable that the suitable range of the step T2 is still larger than 0 nm and equal to or smaller than 30 nm.

Examples 4-1 and 4-2

Figure 24A:
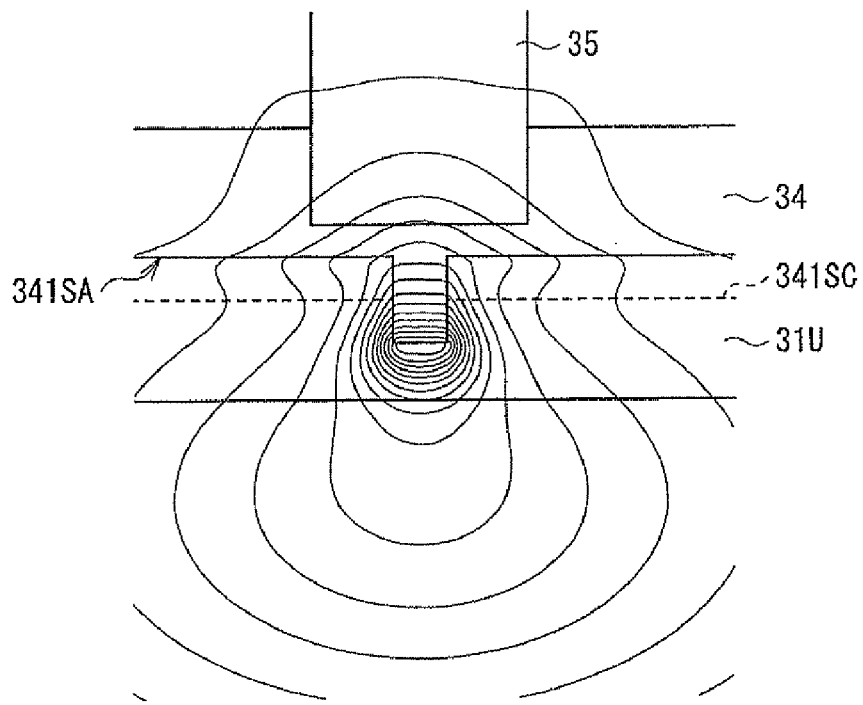
FIG. 24A is a characteristic diagram illustrating light density distribution of near-field light in Example 4-1.
Figure 24B:
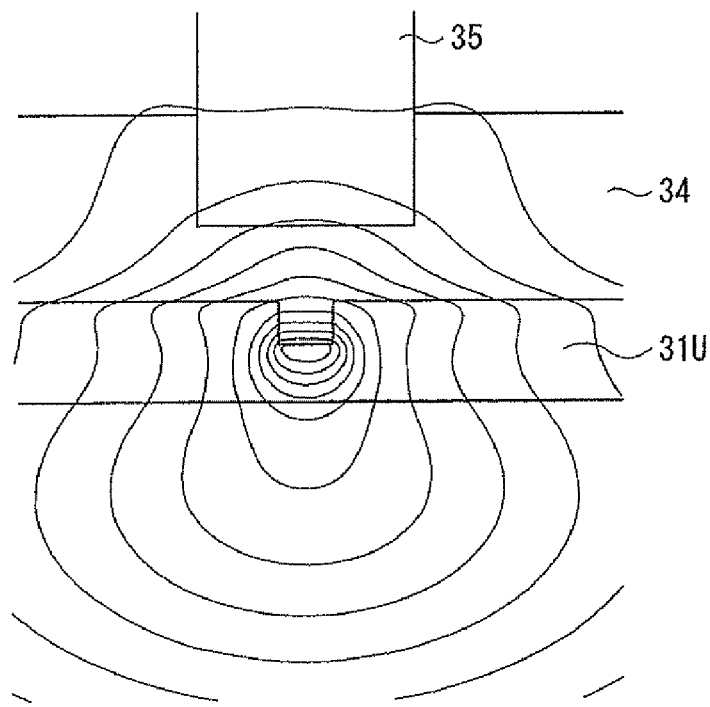
FIG. 24B is a characteristic diagram illustrating light density distribution of near-field light in Example 4-2.

As for the write head section 16 as the above-described embodiments, light density distribution of the near-field light NF generated near the tip portion 34G was calculated by simulation. The results are illustrated in FIG. 24A and FIG. 24B. Herein, it is assumed that the step T1 was 40 nm (Example 4-1) and 20 nm (Example 4-2), and other conditions were common between Examples 4-1 and 4-2. Specifically, the wavelength of the laser light 45 was 800 nm, the length L1 of the front portion 34A was 20 nm, the step T2 was 20 nm, the angle θ of the surface 341SB was 20°, and the gap G (see FIG. 8) between the projection 342 and the waveguide 32 was 25 nm.

As illustrated in FIG. 24A, in Example 4-1, a point near the tip portion 34G of the projection 342 had light density higher than that of the other points, and had rapid light density distribution. On the other hand, in Example 4-2 (FIG. 24B), change in the light density was relatively moderate, and the light density near the tip portion 34G was also relatively small. Therefore, it was confirmed that the thermally-assisted magnetic recording head of the invention is suitable for forming smaller spot size.

Hereinbefore, although the technology has been described with referring to the embodiments, the invention is not limited thereto, and various modifications may be made. For example, in the embodiments, although exemplified is a CPP-type GMR element as a read element, the read element is not limited thereto and may be a CIP (current in plane)-GMR element. In such a case, an insulating layer needs to be provided between an MR element and a lower shield layer, and between the MR element and an upper shield layer; and a pair of leads for supplying a sense current to the MR element needs to be inserted into the insulating layer. Alternatively, a TMR (tunneling magnetoresistance) element with a tunnel junction film may be used as a read element.

In addition, in the thermally-assisted magnetic recording head according to the invention, the configurations (structures, positional relationships, and the like) of the waveguide, the plasmon generator, the magnetic pole, and the like are not limited to those described in the above-described embodiments, and any thermally-assisted magnetic recording head having other configuration may be available.

The correspondence relationship between the reference numerals and the components of the above-described embodiments is collectively illustrated here.
1 . . . housing, 2 . . . magnetic disk, 3 . . . head arm assembly (HAA), 4 . . . head gimbals assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head section, 11 . . . slider, 11A . . . element forming surface, 11B . . . back surface, 11S . . . air bearing surface (ABS), 12 . . . element forming layer, 13 . . . insulating layer, 14 . . . read head section, 16, 70 . . . write head section, 17 . . . cladding, 21 . . . lower shield layer, 22 . . . MR element, 23 . . . upper shield layer, 24, 25, 27, 38, 39, 42 . . . insulating layer, 26 . . . intermediate shield layer, 28 . . . lower yoke layer, 29 . . . leading shield, 30, 36, 37 . . . connecting layer, 31L, 31U, 33A, 33B . . . cladding, 32, 73 . . . waveguide, 34, 71 . . . plasmon generator, 341, 711 . . . base, 341S, 711S . . . surface, 342, 712 . . . projection, 342TS . . . top, 34A . . . front portion, 34B . . . mid-portion, 34C . . . rear portion, 34G . . . tip portion, 35 . . . magnetic pole, 351 . . . first portion, 352 . . . second portion, 40A, 40B . . . connecting section, 41 . . . coil, 43 . . . upper yoke layer, 45 . . . laser light, 46 . . . evanescent light, 47 . . . surface plasmon, 48, 49 . . . edge plasmon, 50 . . . light source unit, 51 . . . supporting member, 51A . . . bonding surface, 51B . . . side surface, 51C . . . light source mounting surface, 60 . . . laser diode, 61 . . . lower electrode, 62 . . . active layer, 63 . . . upper electrode, 64 . . . reflective layer, 65 . . . n-type semiconductor layer, 66 . . . p-type semiconductor layer, 72 . . . metal layer, NF . . . near-field light, T1, T2 . . . step.

What is claimed is:

1. A thermally-assisted magnetic recording head, comprising:
 a magnetic pole;
 a waveguide propagating light in a first direction, the first direction intersecting with an air bearing surface;
 a plasmon generator having a base and a projection, the base having a surface, and the projection having a top, standing partially on the surface of the base, and extending in the first direction, wherein
 the plasmon generator has a first portion and a second portion, the first portion and the second portion being provided in this order from the air bearing surface in a direction away from the air bearing surface,
 the top of the projection and the surface of the base in the first portion define a first step,
 the top of the projection and the surface of the base in the second portion define a second step, and
 the first step is larger than the second step.

2. The thermally-assisted magnetic recording head according to claim 1, wherein
 the plasmon generator is provided, in a cross-track direction, between the magnetic pole and the waveguide, and
 the surface of the base is opposed to the waveguide.

3. The thermally-assisted magnetic recording head according to claim 2, wherein the base is in contact with the magnetic pole.

4. The thermally-assisted magnetic recording head according to claim 1, further comprising a metal layer, wherein
 the plasmon generator is provided, in the first direction, between the waveguide and the air bearing surface,
 the magnetic pole is opposed, in a cross-track direction, to the plasmon generator and the waveguide,
 the metal layer is disposed between the plasmon generator and the magnetic pole, and between the waveguide and the magnetic pole, and
 the surface of the base is opposed to the metal layer.

5. The thermally-assisted magnetic recording head according to claim 1, wherein the base extends in the first direction and a track-width direction.

6. The thermally-assisted magnetic recording head according to claim 1, wherein the plasmon generator has a mid-portion between the first portion and the second portion, and the surface of the base in the mid-portion is inclined relative to the surface of the base in the first portion and to the surface of the base in the second portion.

7. The thermally-assisted magnetic recording head according to claim 1, wherein a cross-section of the projection substantially parallel to the air bearing surface has a rectangular shape or a trapezoidal shape.

8. The thermally-assisted magnetic recording head according to claim 1, wherein the first step and the second step are uniform in the first direction.

9. The thermally-assisted magnetic recording head according to claim 1, wherein the first step is equal to or smaller than 50 nm, and the second step is larger than zero nm and equal to or smaller than 30 nm.

10. The thermally-assisted magnetic recording head according to claim 1, wherein the projection is provided at a position overlapped, in a down-track direction, with the magnetic pole.

11. The thermally-assisted magnetic recording head according to claim 1, wherein a length of the first portion in the first direction is larger than zero nm and equal to or smaller than 40 nm.

12. A head gimbals assembly, comprising:

a magnetic head slider having a side surface, the side surface including the thermally-assisted magnetic recording head according to claim 1; and a suspension having an end, the end being attached with the magnetic head slider.

13. A head arm assembly, comprising:

a magnetic head slider having a side surface, the side surface including the thermally-assisted magnetic recording head according to claim 1;

a suspension having a first end and a second end, the first end being attached with the magnetic head slider; and an arm supporting the second end of the suspension.

14. A magnetic disk unit including a magnetic recording medium and a head arm assembly, the head arm assembly comprising:

a magnetic head slider having a side surface, the side surface including the thermally-assisted magnetic recording head according to claim 1;

a suspension having a first end and a second end, the first end being attached with the magnetic head slider; and an arm supporting the second end of the suspension.

* * * * *